(12) United States Patent
Raetzman et al.

(10) Patent No.: US 12,370,850 B2
(45) Date of Patent: Jul. 29, 2025

(54) WISHBONE-SHAPED LINKAGE AND MODULAR BUSHING ASSEMBLY AND SUSPENSION SYSTEMS INCORPORATING THE SAME

(71) Applicant: Hendrickson USA, L.L.C., Schaumburg, IL (US)

(72) Inventors: Ryan R. Raetzman, Lemont, IL (US); Michael Lynch Phillips, Rolling Meadows, IL (US); Joseph Alan Schneider, Sugar Grove, IL (US); Jason P. Shiffler, Naperville, IL (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 18/271,273

(22) PCT Filed: Jan. 11, 2022

(86) PCT No.: PCT/US2022/011935
§ 371 (c)(1),
(2) Date: Jul. 7, 2023

(87) PCT Pub. No.: WO2022/155117
PCT Pub. Date: Jul. 21, 2022

(65) Prior Publication Data
US 2024/0059113 A1    Feb. 22, 2024

Related U.S. Application Data

(60) Provisional application No. 63/136,220, filed on Jan. 12, 2021.

(51) Int. Cl.
*B60G 7/00* (2006.01)
*B60G 7/02* (2006.01)

(52) U.S. Cl.
CPC ............. *B60G 7/008* (2013.01); *B60G 7/001* (2013.01); *B60G 7/02* (2013.01);
(Continued)

(58) Field of Classification Search
CPC ...... B60G 2206/124; B60G 2206/8201; B60G 2200/315; B60G 2204/148;
(Continued)

(56) References Cited

U.S. PATENT DOCUMENTS 6,527,286 B2    3/2003  Keeler et al.
7,516,968 B2    4/2009  Cortez et al.
(Continued)

FOREIGN PATENT DOCUMENTS

CN    117325604 A  *  1/2024
DE    20 2015 106075 U1    12/2015
(Continued)

OTHER PUBLICATIONS

Drokar, Control Arm for a Wheel Suspension of a Motor Vehicle, Mar. 9, 2017, EPO, DE 102015216838 A1, Machine Translation of Description (Year: 2017).*
Drotar, Control Arm for a Wheel Suspension of a Motor Vehicle, Mar. 9, 2017, EPO, DE 102015216838 A1, Machine Translation of Description (Year: 2017).*
(Continued)

*Primary Examiner* — Paul N Dickson
*Assistant Examiner* — Matthew D Lee
(74) *Attorney, Agent, or Firm* — Cook Alex Ltd.

(57) ABSTRACT

A vehicle suspension system includes a wishbone-shaped linkage having a base, with two limbs extending from the base. Each limb is configured to support a laterally and longitudinally oriented bushing assembly, which may include a bushing assembly received by a laterally and longitudinally oriented mounting tube associated with a free end of the limb. The base includes upper and lower plates wrapping only partially around a laterally extending cross tube. A modular bushing assembly including a pair of (Continued)

bushing lobes and a bar pin is partially received within the cross tube, with the bushing lobes being adjustably positioned on the bar pin to allow for adjustment of the conical rate of the bushing assembly. A mounting assembly includes a pair of mount blocks secured to a vehicle axle, with the bar pin being secured with respect to the axle via the mount blocks, thereby associating the linkage to the axle.

19 Claims, 14 Drawing Sheets

(52) U.S. Cl.
CPC .. *B60G 2200/315* (2013.01); *B60G 2202/152* (2013.01); *B60G 2204/1482* (2013.01); *B60G 2204/41* (2013.01); *B60G 2206/124* (2013.01); *B60G 2206/8201* (2013.01)

(58) Field of Classification Search
CPC B60G 2204/1482; B60G 7/008; B60G 7/001; B60G 2202/1524; B60G 2204/41
See application file for complete search history.

(56) References Cited

U.S. PATENT DOCUMENTS

| | | | |
|---|---|---|---|
| 7,862,058 B2 | 1/2011 | Bubulka et al. | |
| 10,207,737 B2 | 2/2019 | Gottschalk et al. | |
| 10,486,481 B2* | 11/2019 | He | F16C 11/0695 |
| 2008/0224435 A1 | 9/2008 | Holt | |
| 2014/0271032 A1 | 9/2014 | Dilworth et al. | |
| 2018/0231088 A1* | 8/2018 | Zimmerman | F16F 1/3814 |

FOREIGN PATENT DOCUMENTS

| | | | | |
|---|---|---|---|---|
| DE | 102015216838 A1 * | 3/2017 | | B60G 7/001 |
| DE | 102017219373 A1 * | 5/2019 | | |
| EP | 1 120 229 A1 | 8/2001 | | |
| EP | 1223058 A2 * | 7/2002 | | B60G 7/001 |

OTHER PUBLICATIONS

International Search Report and Written Opinion for PCT/US2022/011935 dated Jun. 21, 2022.

* cited by examiner

WISHBONE-SHAPED LINKAGE AND MODULAR BUSHING ASSEMBLY AND SUSPENSION SYSTEMS INCORPORATING THE SAME

RELATED APPLICATIONS

This application is a U.S. national stage application of PCT Patent Application Serial No. PCT/US2022/011935, filed Jan. 11, 2022, which claims the benefit of U.S. Provisional Application Ser. No. 63/136,220, filed on Jan. 12, 2021, the disclosures of both of which is are hereby incorporated by reference in its their entirety.

DESCRIPTION

Technical Field

The present disclosure relates to vehicle suspension systems. More particularly, the present disclosure relates to vehicle suspension systems incorporating a wishbone-shaped linkage component and/or a modular lobed bushing assembly.

Background

Vehicle suspension systems suspend the vehicle chassis over the axle of the vehicle and absorb axle movement caused by the wheels encountering obstacles, holes, and uneven road surfaces. Axle movement occurs not only when the wheels encounter obstacles in the road but also during acceleration and braking and during cornering (when the vehicle makes turns). In these situations, it is required that the suspension system provides stability to the vehicle by controlling axle movement.

Suspension systems utilize several different components in various configurations to control the range of axle motions. Leaf springs or beams are widely used components of suspension systems and play a major role in controlling certain axle motions. Leaf springs however, are expensive to manufacture and assemble, add significant weight to the suspension, and add to the overall complexity of the suspension when used in conjunction with a stabilizer bar for additional roll stability to achieve a desired vertical spring rate in a given suspension packaging envelope. When optimizing for ride comfort, a low vertical spring rate is desirable; however, roll stability usually suffers, especially in leaf spring suspension systems. Primary roll stiffness is directly proportional to the vertical spring rate of leaf spring suspensions. Therefore, in order to provide the desired ride comfort characteristics, an auxiliary roll stiffness mechanism such as a stabilizer bar must be employed, which adds both cost and weight. Reducing the weight of the suspension system translates into higher payload capacity, in the case of commercial vehicles, and/or lowers fuel costs. U.S. Pat. No. 6,527,286, which is hereby incorporated by reference herein, discloses suspension systems that do not employ leaf springs. In the suspension systems described in U.S. Pat. No. 6,527,286, the pair of leaf springs—one on each side of the axle—is replaced by a fabricated torque box, along with other components.

While replacing the pair of leaf springs with a torque box can be readily accomplished in rear, tandem, or trailer axles, there are issues unique to the front steering axle that makes incorporating the torque box configuration more difficult in steering axle suspension systems. First, there are packaging constraints. The space above and around the steering axle is typically occupied by the engine, cooling systems, and oil pan sump, among other things. This leaves limited space for the torque box, especially considering that the torque box will move up and down in conjunction with the axle.

Another issue relates to the kinematics involved in the steering axle. Assuming a torque box could be incorporated in a steering axle suspension system, there may be undesirable steering kinematics. For example, in a leading arm arrangement in which the torque box is connected to the steering axle and frame, with the axle positioned ahead of the torque box linkages, the compliant nature of the bushing and bar arrangement of the torque box could cause an undesirable over-steer effect. Over-steer is when the vehicle turns into the bend or corner the driver is attempting to negotiate more than what was desired or expected. Under-steer effect is the opposite, which is when the vehicle does not turn into the bend as much as anticipated, thereby forcing the driver to take additional steering action to turn the vehicle. An under-steer condition is more desirable and safer than an over-steer condition because the driver feels more in control of the vehicle and because over-steer could contribute to a dangerous rollover condition.

U.S. Pat. No. 7,516,968, which is hereby incorporated by reference herein, describes an approach to overcoming the limitations of a torque box. U.S. Pat. No. 7,516,968 describes a wishbone-shaped linkage component that better fits within the limited space available in the vicinity of a steering axle, while avoiding the adverse effects on steering kinematics that a torque box may cause. While the linkage component described in U.S. Pat. No. 7,516,968 has proven to be an improvement to the torque box of U.S. Pat. No. 6,527,286, additional improvements would be advantageous. For example, it would be advantageous to provide an assembly having increased lateral and roll stiffness, while also allowing for a wide range of rate tuning.

SUMMARY

There are several aspects of the present subject matter which may be embodied separately or together in the devices, systems, and methods described and/or claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto or later amended.

In one aspect, a linkage for use in a vehicle suspension system includes a base configured to receive a laterally oriented bushing assembly. First and second limbs each extend from the base to a free end configured to receive a laterally and longitudinally oriented bushing assembly.

In another aspect, a linkage for use in a vehicle suspension system includes a laterally extending cross tube configured to receive a bushing assembly. The linkage also includes a body having upper and lower plates only partially wrapping around the cross tube, without fully encircling any portion of the cross tube.

In yet another aspect, a vehicle suspension system includes a laterally extending axle, a linkage, a laterally extending bushing assembly, and a mounting assembly. The bushing assembly includes a bushing at least partially received by the linkage and a bar pin received by the bushing and including first and second ends positioned on opposite lateral sides of the bushing. The mounting assembly includes a first mount block associated with the first end of the bar pin, a second mount block associated with the second end of the bar pin, and first and second mechanical fasteners. Each end of the bar pin defines a longitudinally extending bore, with the longitudinally extending bore of the first end of the bar pin receiving a first portion of the first mechanical fastener, and with the longitudinally extending bore of the second end of the bar pin receiving a first portion of the second mechanical fastener. Each mount block defines a longitudinally extending bore, with the longitudinally extending bore of the first mount block aligned with the longitudinally extending bore of the first end of the bar pin and receiving a second portion of the first mechanical fastener, and with the longitudinally extending bore of the second mount block aligned with the longitudinally extending bore of the second end of the bar pin and receiving a second portion of the second mechanical fastener. The axle defines first and second openings, with the first opening being aligned with the longitudinally extending bores of the first end of the bar pin and the first mount block and receiving a third portion of the first mechanical fastener, and with the second opening being aligned with the longitudinally extending bores of the second end of the bar pin and the second mount block and receiving a third portion of the second mechanical fastener.

In another aspect, a method of associating a linkage to a vehicle axle includes providing a laterally extending vehicle axle defining first and second openings; first and second mount blocks each defining a first longitudinally extending bore; and a linkage assembly including a linkage and a laterally extending bushing assembly. The first mount block is associated to a first end of the bushing assembly and the second mount block is associated to a second end of the bushing assembly. The first longitudinally extending bore of the first mount block and a longitudinally extending bore of the first end of the bushing assembly are aligned, followed by a first mechanical fastener being inserted into the first longitudinally extending bore of the first mount block and the longitudinally extending bore of the first end of the bushing assembly. The first longitudinally extending bore of the second mount block and a longitudinally extending bore of the second end of the bushing assembly are aligned, followed by a third mechanical fastener being inserted into the first longitudinally extending bore of the second mount block and the longitudinally extending bore of the second end of the bushing assembly. The first opening of the vehicle axle is aligned with the first mechanical fastener and the second opening of the vehicle axle is aligned with the second mechanical fastener, followed by the mechanical fasteners being advanced into the aligned openings of the vehicle axle to associate the linkage to the vehicle axle.

In yet another aspect, a bushing assembly includes a bar pin and first and second bushing lobes that are movably mounted onto the bar pin. Each bushing lobe includes a sleeve extending between first and second ends and an elastomeric layer secured to the sleeve and encircling a portion of the sleeve. The elastomeric layer of each bushing lobe includes a thickened section, which is positioned a first distance away from the first end of the associated sleeve and a second distance away from the second end of the associated sleeve, with the first distance being different from the second distance. The first and second bushing lobes are mountable onto the bar pin in at least a first configuration in which the first end of the first sleeve is in contact with the first end of the second sleeve, a second configuration in which the second end of the first sleeve is in contact with the second end of the second sleeve, and a third configuration in which the first and second bushing lobes are spaced apart, with the thickened sections being separated by different distances in each configuration.

These and other aspects of the present subject matter are set forth in the following detailed description of the accompanying drawings.

DETAILED DESCRIPTION OF THE ILLUSTRATED EMBODIMENTS

The embodiments disclosed herein are for the purpose of providing an exemplary description of the present subject matter. They are, however, only exemplary and not exclusive, and the present subject matter may be embodied in various forms. Therefore, specific details disclosed herein are not to be interpreted as limiting the subject matter as defined in the accompanying claims.

Figure 1:
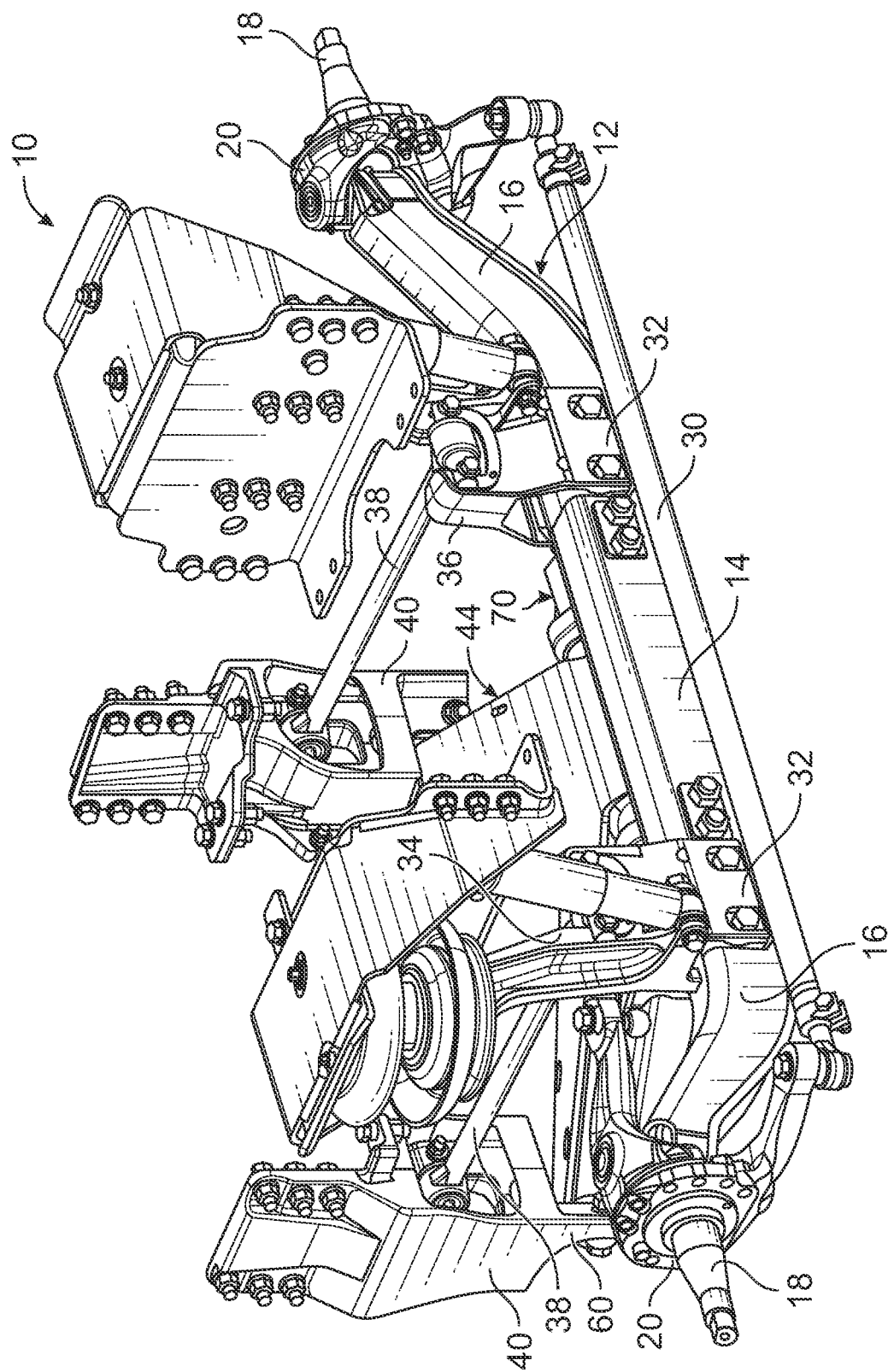
FIGS. 1 and 2 are perspective views of a suspension system designed in accordance with principles of the present disclosure.
Figure 2:
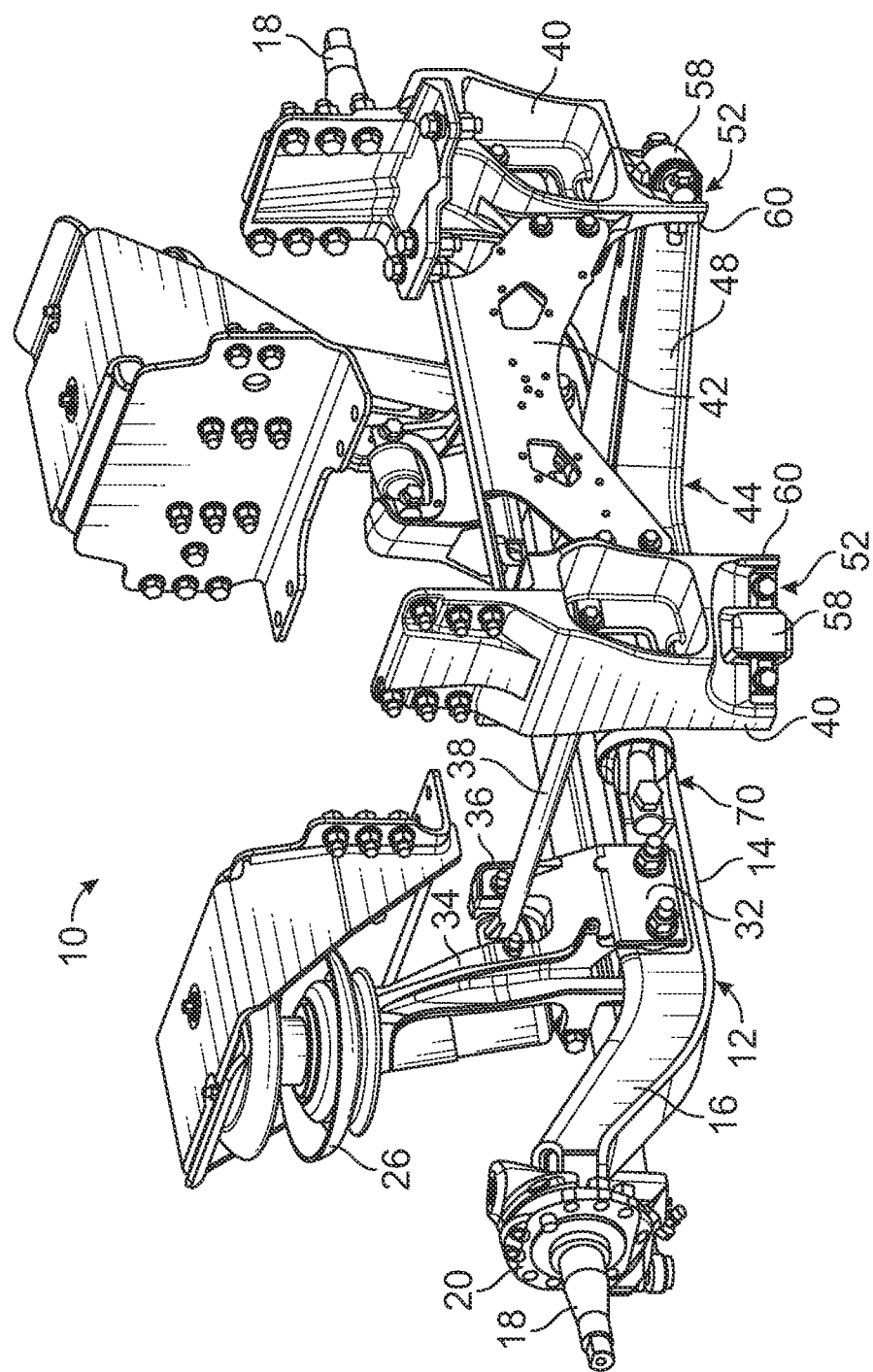
Figure 3:
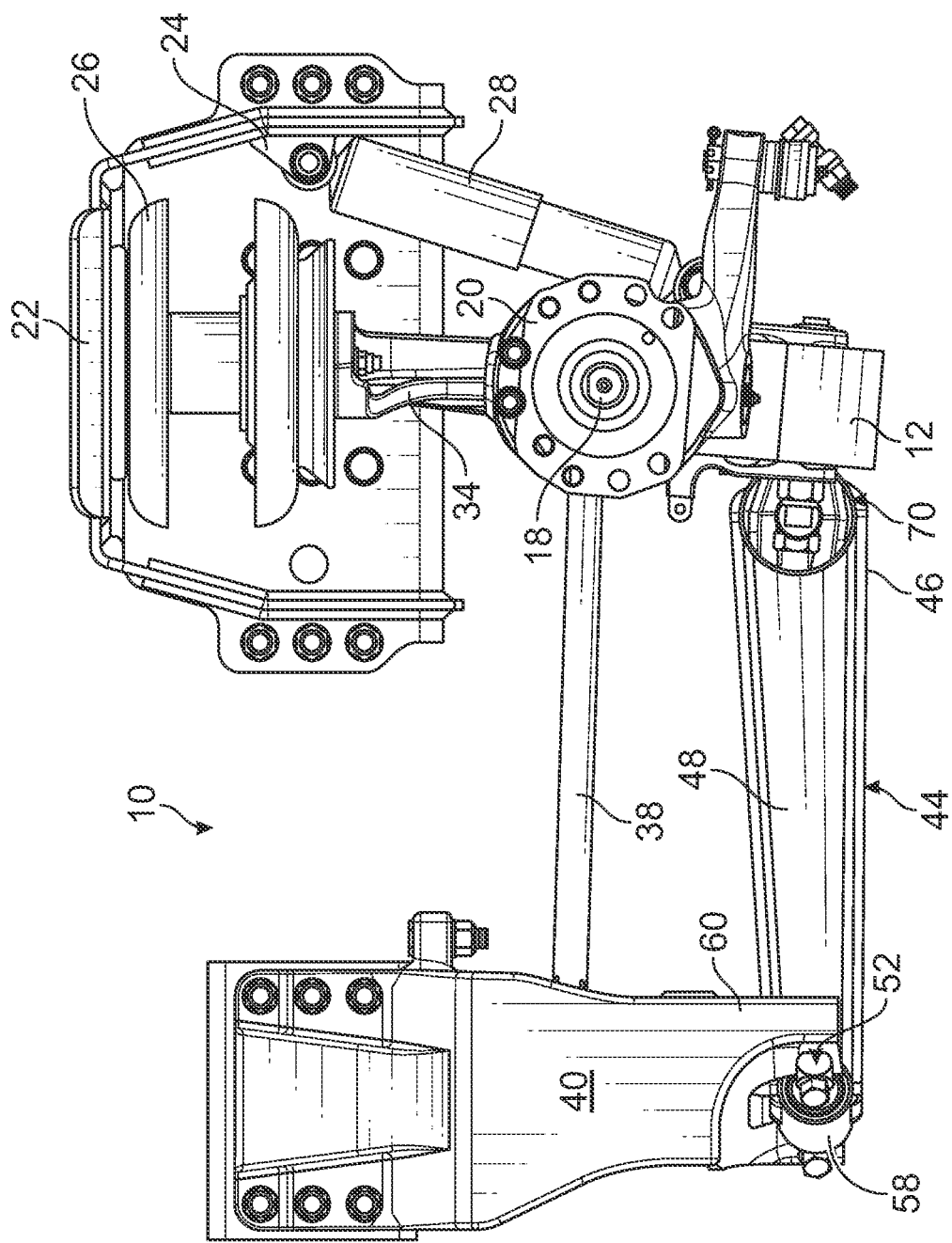
FIG. 3 is a side elevational view of the suspension system of FIGS. 1 and 2.
Figure 4:
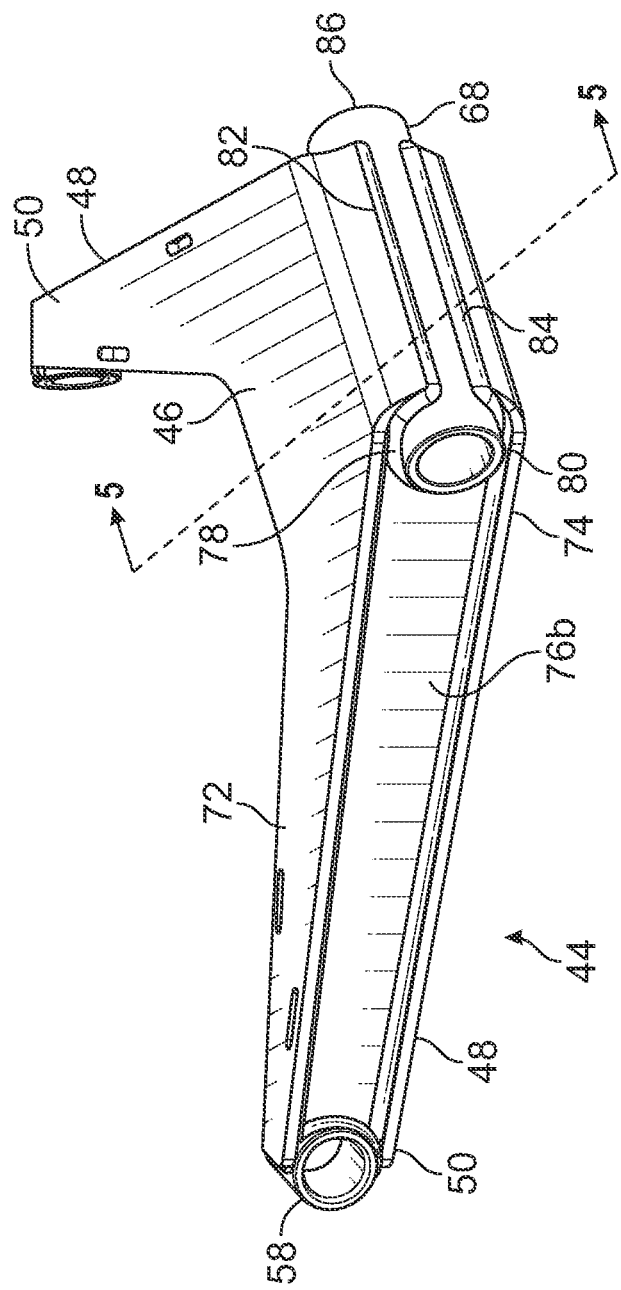
FIG. 4 is a perspective view of a wishbone-shaped linkage component designed in accordance with principles of the present disclosure.

FIGS. 1-3 illustrate components of an exemplary vehicle suspension system embodying various aspects of the present disclosure. It should be understood that the illustrated suspension system 10 is merely exemplary and that suspension systems according to the present disclosure may be differently configured without departing from the scope of the present disclosure.

The suspension system 10 shown in FIGS. 1-3 connects a laterally or transversely extending axle 12 to longitudinally extending vehicle frame members (not illustrated) positioned on opposite sides of a vehicle chassis. The axle 12 is shown as having a midsection 14 and upwardly inclined portions 16 at opposite ends of the midsection 14, which may include the axle 12 being configured according to the disclosure of U.S. Pat. No. 7,862,058, which is hereby incorporated by reference herein. However, it should be understood that the axle 12 may be variously configured without departing from the scope of the present disclosure.

A spindle 18 is used with a steering knuckle 20 for mounting wheels to the axle 12. The steering knuckle is connected to the axle 12 by a king pin in a known manner. In one embodiment, the spindle 18 and steering knuckle 20 have a fabricated configuration of the type described in U.S. Pat. No. 10,207,737, which is hereby incorporated by reference herein, though it should be understood that the spindle 18 and steering knuckle 20 may be differently configured without departing from the scope of the present disclosure.

The suspension system 10 absorbs the movement of the axle 12 when the wheels encounter obstacles and/or uneven road surfaces and maintains the vehicle chassis at a relatively constant height. This provides a smoother and more comfortable ride for the passenger(s). Besides cushioning the ride, the suspension system 10 also functions to control the lateral and longitudinal movement of the axle 12 in addition to providing roll stiffness, which allows for improved handling of the vehicle.

Air spring mounting brackets 22 and shock absorber mounting brackets 24 (FIG. 3) are provided to permit air springs 26 and shock absorbers 28, respectively, to be attached to the frame members. The shock absorber mounting brackets 24 are attached to the frame members at a location above a tie rod 30 (FIG. 1) extending between the steering knuckles 20. The upper ends of the shock absorbers 28 are pivotally connected to their associated shock absorber mounting bracket 24, while the lower ends of the shock absorbers 28 are pivotally connected to the axle 12 via axle seats 32.

The air spring mounting brackets 22 are shown in FIG. 3 as being connected to the frame members at a location above the axle 12. The upper ends of the air springs 26 are attached to their associated air spring mounting brackets 22, while the lower ends of the air springs 26 are connected to the axle seats 32. Each axle seat 32 includes an upwardly extending platform 34 for mounting the air springs 26.

Each axle seat 32 also includes a clevis or formation 36 for pivotally connecting torque rods 38 to the axle 12. The end of each torque rod 38 accommodated by the formations 36 includes a laterally extending bore receiving a bolt, pin, or other fastener to pivotally connect the torque rod 38 to the formation 36. Bushings can be placed around the bolt or pin, and/or washers can be placed between the torque rod 38 and the associated formation 36. The opposite end of each torque rod 38 is pivotally connected to an associated frame hanger 40 in a similar arrangement, with the frame hangers 40 being connected to opposite ends of a cross member 42 (FIG. 2). The torque rods 38 are oriented longitudinally and preferably at an angle (as in FIG. 3), as will be described in greater detail. In one embodiment, the torque rods 38 are coincident with the drag links associated with the tie rod 30, which decreases bump steer.

A lower linkage 44 (which is shown in greater detail in FIGS. 4-8) is also pivotally connected to the frame hangers 40, with an opposite end of the lower linkage 44 being pivotally connected to the axle 12. The illustrated lower linkage 44 is configured as a wishbone-shaped linkage having a base 46 and two laterally and longitudinally extending limbs 48. While such a wishbone configuration may be particularly advantageous (as will be described in greater detail herein), it should be understood that certain aspects of the present disclosure are independent of the particular configuration of the lower linkage. It should also be understood that, while the illustrated suspension system 10 includes a wishbone-shaped linkage 44 positioned beneath a pair of torque rods 38 (which may be referred to as a "low mount" configuration), it is within the scope of the present disclosure for a wishbone-shaped linkage to instead be positioned above a pair of torque rods (which may be referred to as a "high mount" configuration).

Figure 7:
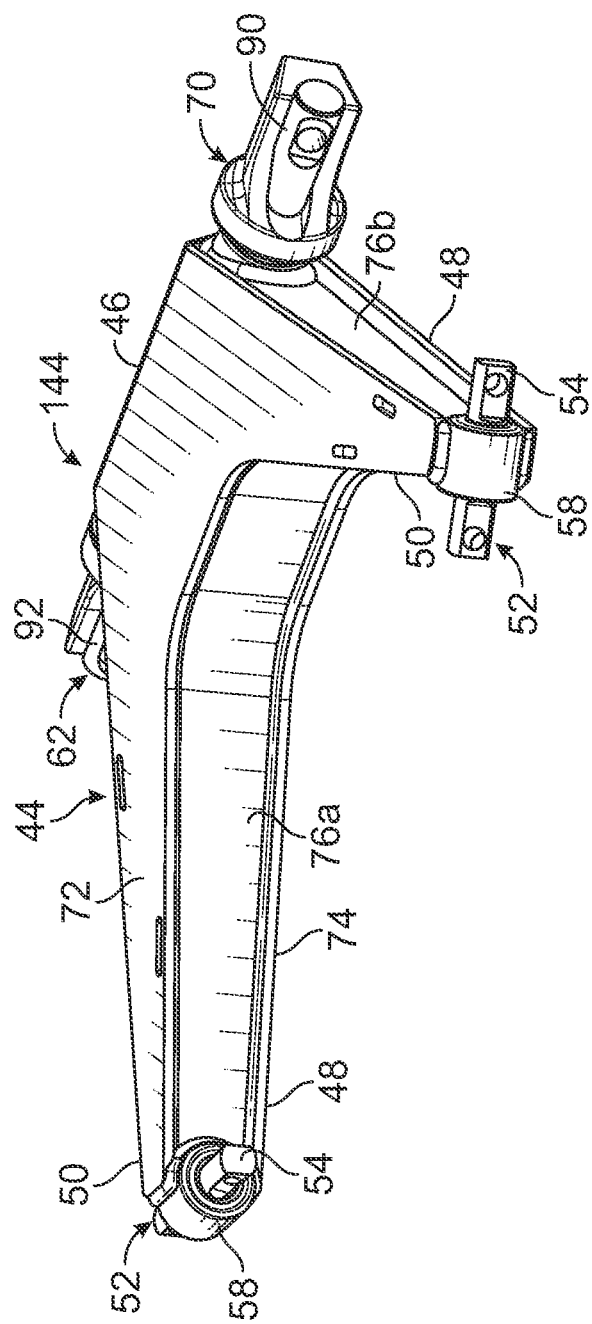
Figure 8:
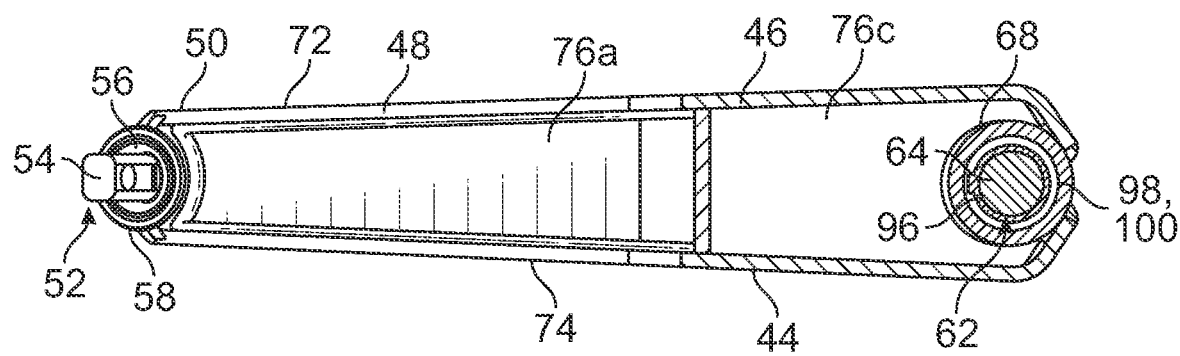
FIG. 8 is a cross-sectional view taken at line 8-8 of FIG. 6.

The free end 50 of each limb 48 receives a bushing assembly 52 (FIGS. 6-8) comprised of a bar pin 54 and a bushing 56 (FIG. 8). Mounting tubes 58 may be secured to the free end 50 of each limb 48 (e.g., by welds) to receive at least a portion of the bushing 56, with ends of the bar pin 54 positioned outwardly of the mounting tube 58 for pivotal connection to a frame hanger 40 by a clevis or formation 60 (FIG. 2).

The base 46 of the lower linkage 44 includes an associated bushing assembly 62 having a bar pin 64 and a bushing 66, which bushing assembly 62 may extend laterally through a cross tube 68 of the base 46 (FIG. 8). The bushing assembly 62 is shown in greater detail in FIGS. 9 and 10, As illustrated, the bushing assembly 62 is secured to the axle 12 by a mounting assembly 70 (see FIGS. 6 and 7), with the bushing assembly 62 allowing the lower linkage 44 to pivot with respect to the mounting assembly 70 and, hence, the axle 12. This orientation of the base 46 being connected to the axle 12 may be referred to as a "base-to-axle" configuration. It should be understood that the illustrated orientation of the lower linkage 44 may be reversed, with the limbs 48 instead being connected to the axle 12 and the base 46 being connected to the cross member 42, which may be referred to as a "base-to-cross member" configuration. The decision of whether to configure the suspension system in any combination of a high mount position or low mount position and a base-to-axle connection or a base-to-cross member connection (and a leading arm or trailing arm configuration) is dependent on several factors, which may include the packaging space limitations of the particular vehicle, the positioning of the desired roll center of the suspension system, and the steering kinematics desired.

Similar to the torque rods 38, the lower linkage 44 is oriented longitudinally and preferably at an angle, as shown in FIG. 3. Preferably, the frame hangers 40, cross member 42, axle 12, and axle seats 32 are configured to support and orient the pair of torque rods 38 and lower linkage 44 in a configuration that eliminates 75 excess dive when braking. The "anti-dive" orientation of the torque rods 38 and lower linkage 44 (which creates wind-up torque that resists the tendency to dive during braking) is best shown in FIG. 3, with the torque rods 38 being oriented slightly downwardly (from left to right in the orientation of FIG. 3) and the lower linkage 44 being oriented slight upwardly (from left to right in the orientation of FIG. 3), such that imaginary lines extending from the axes of the torque rods 38 and the lower linkage 44 would converge. A third imaginary line is drawn from the point at which a tire associated with the axle contacts the ground (which point is directly below the center of the spindle and associated with the static loaded radius) through the intersection point of the first two lines and extended to the longitudinal location of the center of gravity of the vehicle. The height of the third line at the longitudinal location is compared to the height of the center of gravity, with the ratio being expressed as a percentage (which is approximately 29.8% in one embodiment, but may be within a range of approximately 25-40%) that may be referred to as the "anti-dive" percentage.

Turning now more particularly to the configuration of the illustrated lower linkage 44, the two limbs 48 are amply separated from each other and extend laterally and longitudinally away from the base 46 considerably, leaving a relatively large mouth or open area. More specifically, the distance between the free ends 50 of the limbs 48 is appreciably greater than the width (i.e., the lateral dimension) of the base 46, with the length (i.e., the longitudinal dimension) of the limbs 48 being appreciably greater than the length of the base 46. In an exemplary embodiment, the distance between the free ends 50 of the limbs 48 is greater than length of the limbs 48 and greater than the width of the base 46. This may include the distance between the free ends 50 of the limbs 48 being at least 50% greater than the length of the limbs 48 and at least double the width of the base 46.

The body of the illustrated linkage 44 is formed of an upper plate 72 and a lower plate 74 (FIGS. 4 and 5), with a plurality of side plates 76a-c each extending from the upper plate 72 to the lower plate 74. The side plates 76a-c may be secured to the upper and lower plates 72 and 74 by any suitable approach, which may include welding if the plates are formed of a metallic material (as may be preferred). Each side plate extends along a different portion of the perimeter defined by the upper plate 72 (which may be substantially identical to the perimeter defined by the lower plate 74), with each side plate being inset with respect to the associated portion of the perimeter. In the illustrated embodiment, three side plates are provided, with a curved side plate 76a extending from the free end 50 of one of the limbs 48 to the base 46 and then back to the free end 50 of the other limb 48 (FIG. 7), while the other two side plates 76b and 76c are substantially flat or planar and each extend from the free end 50 of one of the limbs 40 to the base 46. Providing the linkage 44 with inset side plates 76a-c will increase the torsional stiffness of the linkage 44, reducing the stress on the upper and lower plates 72 and 74 during roll events.

Figure 5:
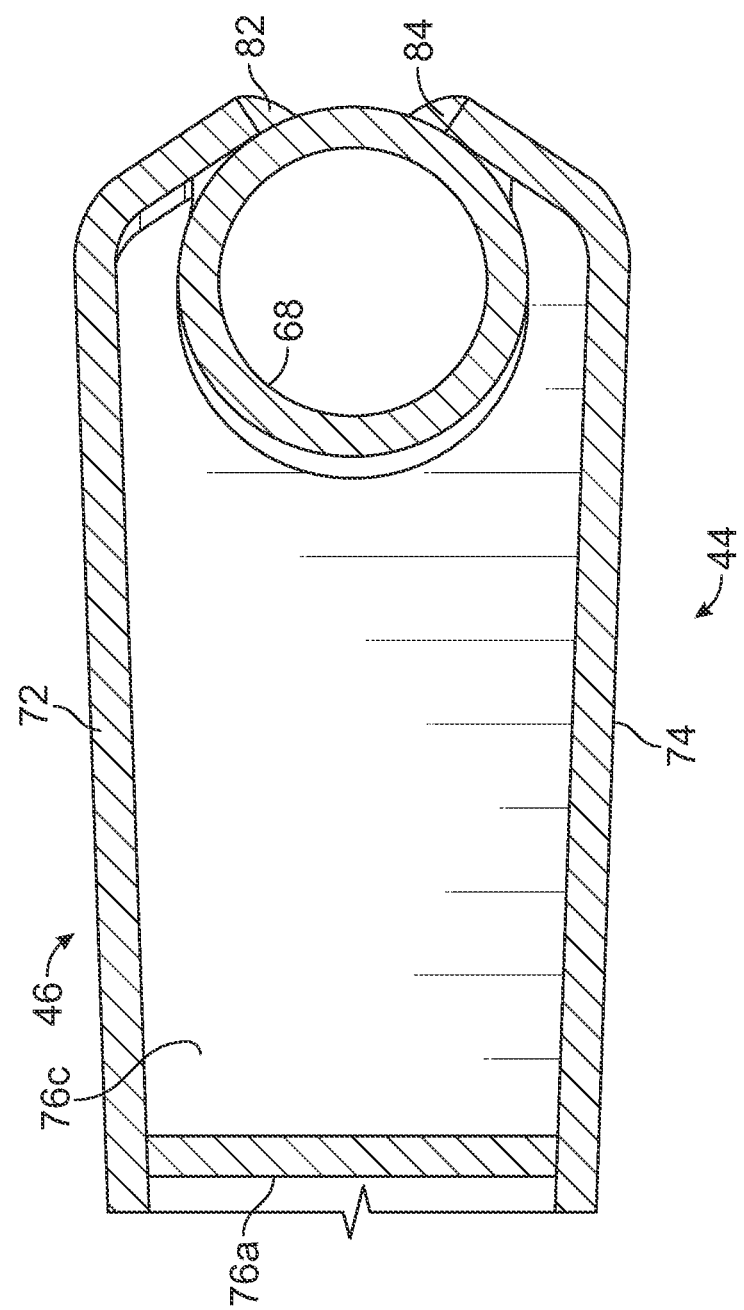
FIG. 5 is a cross-sectional view taken at line 5-5 of FIG. 4.

The laterally extending cross tube 68 (which may be formed of a metallic material, for example) is also positioned between the upper and lower plates 72 and 74, being associated with the base 46 of the linkage 44 and extending from side plate 76b to side plate 76c. As best shown in FIG. 5, the upper and lower plates 72 and 74 only partially wrap around the cross tube 68, without fully encircling any portion of the cross tube 68, which decreases the weight and stress of the linkage 44 compared to a configuration in which the cross tube 68 is fully encircled by the upper and lower plates 72 and 74 (which configuration may be employed in an alternative embodiment, if additional strength and support are required). The cross tube 68 may be secured to the upper and lower plates 72 and 74 and to the side plates 76b and 76c by any suitable approach, which may include welding. In the illustrated embodiment, a first side weld 78 (FIG. 4) is positioned adjacent to a first end 80 of the cross tube 68 and extends along the interface between the cross tube 68 and side plate 76b. An upper lateral weld 82 extends from the upper end of the first side weld 78 along the interface between the upper plate 72 and the cross tube 68, while a lower lateral weld 84 extends from the lower end of the first side weld 78 along the interface between the lower plate 74 and the cross tube 68. A second side weld (not visible) is positioned adjacent to the second end 86 of the cross tube 68 and extends along the interface between the cross tube 68 and side plate 76c, with the upper lateral weld 82 terminating at an upper end of the second side weld and the lower lateral weld 84 terminating at a lower end of the second side weld. Providing the linkage 44 with inset side plates 76a-c (which is not required, but may be advantageous) moves stress from the weld toe of the cross tube welds.

As described above, a pair of mounting tubes 58 (which may be formed of a metallic material, for example) may be associated with the free ends 50 of the limbs 48, which may include the mounting tubes 58 being welded or otherwise secured to the free ends 50 of the limbs 48. It will be seen that the mounting tubes 58, the side plates 76a-c, and the cross tube 68 combine to extend along the entire perimeter of the upper and lower plates 72 and 74, thereby defining a substantially hollow body of the linkage 44 (as best shown in FIGS. 5 and 8). While the linkage 44 is shown in as being substantially hollow (which may be advantageous for decreasing the weight of the linkage 44), it should be understood that one or more supports or the like extending from the upper plate 72 to the lower plate 74 may be positioned within the interior of the linkage 44 to strengthen the linkage 44, if necessary.

In contrast to the cross tube 68, which is laterally oriented, each of the mounting tubes 58 is laterally and longitudinally oriented (which may also be referred to as an "angled" orientation). Each mounting tube 58 is shown as extending substantially perpendicularly to the direction in which the associated limb 48 extends, with each mounting tube 58 having an orientation rotated approximately 30-35° (in opposite directions) from a lateral orientation. In other embodiments, the mounting tubes 58 may be oriented at a different angle from a lateral orientation, though it may be advantageous for the mounting tubes 58 to be oriented at equal, but opposite orientation angles for balanced performance. The mounting tubes 58 are shown as facing generally away from each other, though it is within the scope of the present disclosure for the mounting tubes 58 to be oriented to face generally toward each other.

Figure 6:
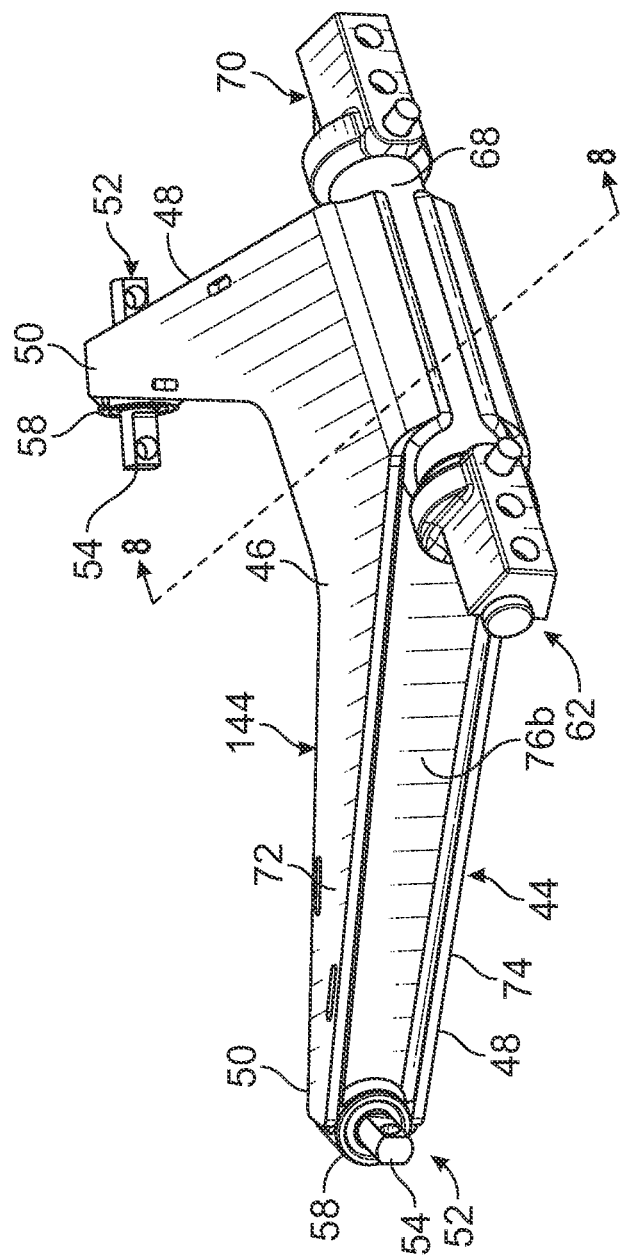
FIGS. 6 and 7 are perspective views of the wishbone-shaped linkage component of FIG. 4, along with associated components for incorporating the wishbone-shaped linkage component into a suspension system.

On account of the mounting tubes 58 having an angled orientation, the bushing assemblies 52 accommodated by the mounting tubes 58 will also have an angled orientation, as shown in FIGS. 6 and 7. Accordingly, the devises or formations 60 of the frame hangers 40 accommodating the angled bushing assemblies 52 must also be angled to match the angle of the associated bushing assembly 52. Of course, in a base-to-cross member configuration (in which the limbs 48 are associated to the axle 12), the devises or formations of the axle or axle seat or other structure accommodating the angled bushing assemblies 52 would need to be angled to match the angles of the bushing assemblies 52 associated with the free ends 50 of the limbs 48.

Regardless of the exact orientation of the mounting tubes 58, bushing assemblies 52 having angled orientations are advantageous compared to bushing assemblies having lateral orientations. For example, angled bushing assemblies 52 will have increased lateral stiffness, with a lateral input being reacted at the bushing 56 with both axial and conical rates increasing the bushing reaction rates.

Figure 9:
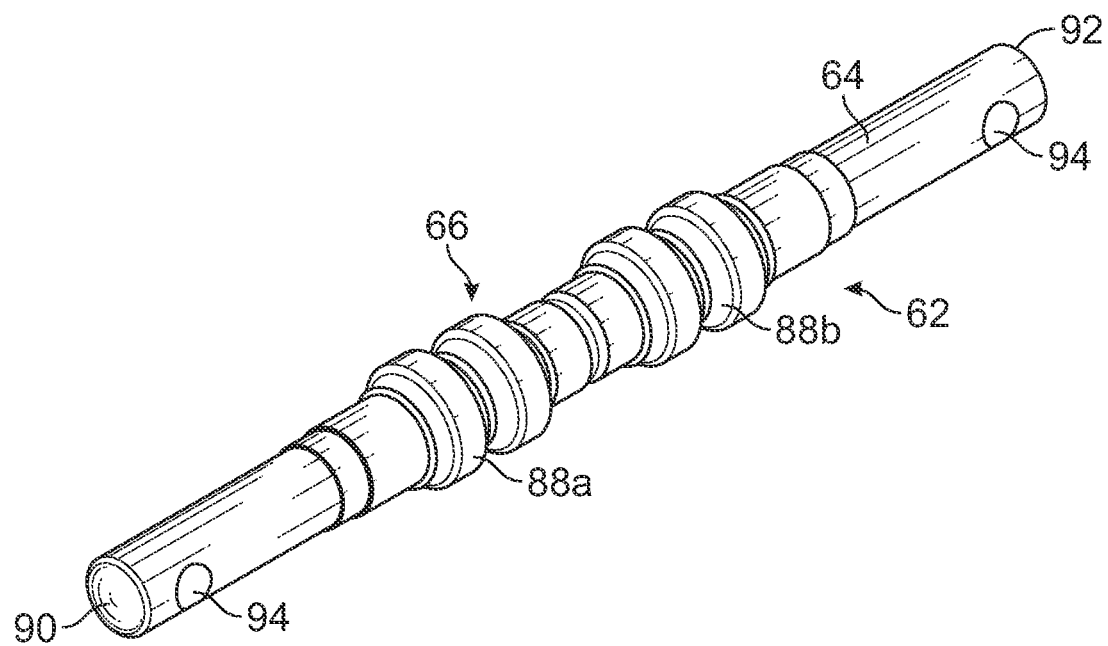
FIG. 9 is a perspective view of a bushing assembly suitable for use in combination with the wishbone-shaped linkage component of FIGS. 4-8.
Figure 10:
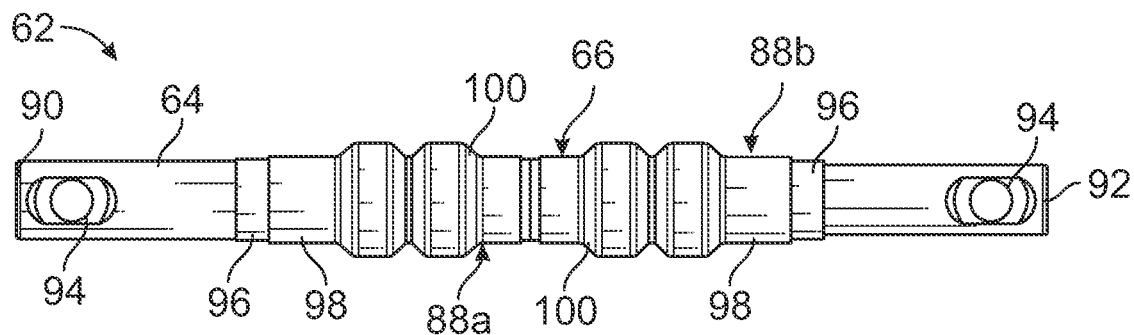
FIG. 10 is a front elevational view of the bushing assembly of FIG. 9.

Turning now to another aspect of the present disclosure, FIGS. 9 and 10 show an exemplary configuration of a bushing assembly 62 that may be associated with the linkage 44 of FIGS. 4-8. While the bushing assembly 62 of FIGS. 9 and 10 will be described in the context of its use in combination with the linkage 44 of FIGS. 4-8, it should be understood that the bushing assembly 62 of FIGS. 9 and 10 and the features it exemplifies are not limited to use with any particular linkage and that bushing assemblies of this type may be used in various settings without departing from the scope of the present disclosure.

In the illustrated embodiment, the bushing assembly 62 is press fit into the laterally oriented cross tube 68 of the linkage 44 after the bushing assembly 62 has been fully assembled. The bushing assembly 62 comprises a bar pin 64 having a pair of bushing lobes 88*a* and 88*b* mounted onto it, though it should be understood that additional bushing lobes may be mounted onto the bar pin 64 without departing from the scope of the present disclosure. The bar pin 64 (which may be formed of a metallic material, for example) is illustrated as a substantially cylindrical structure, with each end 90, 92 of the bar pin 64 including a longitudinally extending bore 94. The bores 94 are used to mount the linkage assembly to other components of the suspension system 10, so the bar pin 64 will have a greater width than the cross tube 68 in order to position the ends 90 and 92 of the bar pin 64 outside of the cross tube 68, on opposite sides of the cross tube 68, as best shown in FIG. 7. While the bar pin 64 is shown as being substantially cylindrical, with a pair of longitudinally extending bores 94, it should be understood that bar pins according to the present disclosure may be differently shaped without departing from the scope of the present disclosure, including being configured to accommodate a different approach (other than longitudinally extending bores) to incorporating the bushing assembly into a suspension system.

Figure 11:
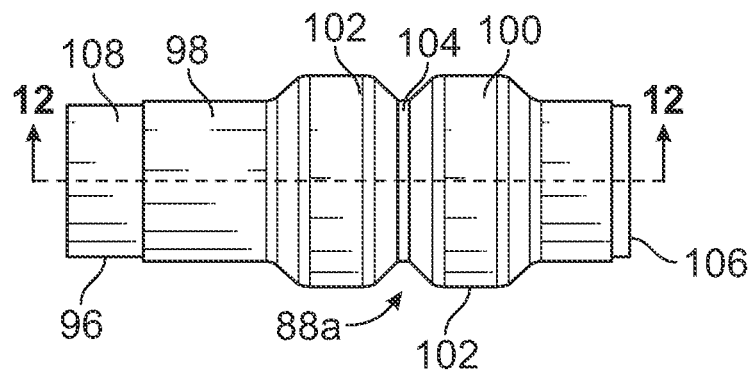
FIG. 11 is a front elevational view of one of the lobes of the bushing assembly of FIG. 9.
Figure 12:
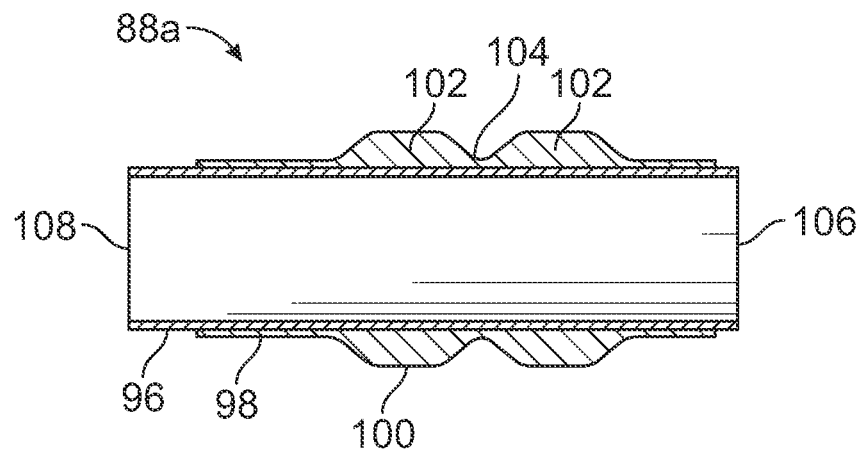
FIG. 12 is a cross-sectional view taken at line 12-12 of FIG. 11.
Figure 13:
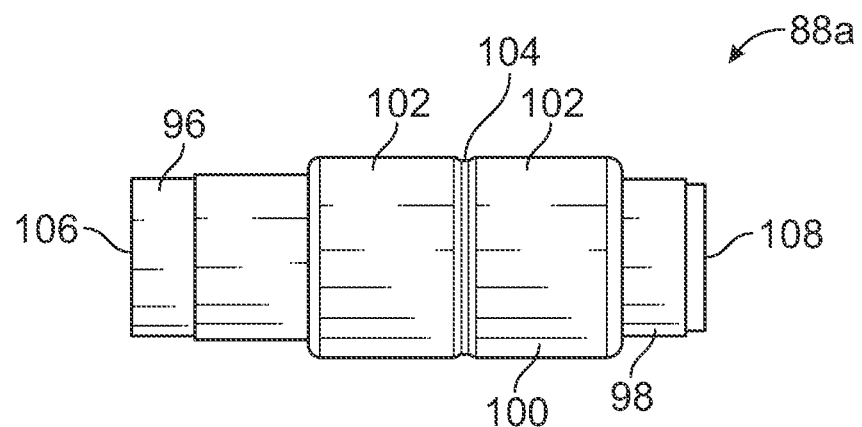
FIG. 13 illustrates the bushing lobe of FIG. 11, in an installed condition.

As for the bushing lobes 88*a* and 88*b*, they may be either completely or partially positioned within the cross tube 68. Each bushing lobe 88*a*, 88*b* is comprised of a sleeve 96 (which may be formed of a metallic material, for example) with an elastomeric layer 98 (which may be formed of rubber, for example) secured to and encircling a portion of the sleeve 96 (FIGS. 11-13). The sleeve 96 is configured to be pressed onto the bar pin 64 in a direction from one end 90, 92 of the bar pin 64 toward the other end 90, 92, such that the shape of the sleeve 96 should be informed by the shape of the bar pin 64. For example, in the illustrated embodiment, the bar pin 64 is substantially cylindrical, with the sleeve 96 being substantially tubular, with an inner diameter that is preferably no larger than the outer diameter of the bar pin 64 to create an interference fit when the bar pin 64 is received within the sleeve 96. It may be advantageous for the inner diameter of the sleeve 96 to be slightly smaller than the outer diameter of the bar pin 64 such that pressing the sleeve 96 onto and along the bar pin 64 will create an interference fit between the bar pin 64 and the sleeve 96 that is sufficiently tight or strong so as to react torsional and lateral loads without slipping. In other embodiments, in which the bar pin has a non-circular cross-sectional shape, a differently configured sleeve may be provided to accommodate the cross-sectional shape of the bar pin.

The elastomeric layer 98 may be molded directly onto the associated sleeve 96 or may be otherwise secured to the sleeve 96 (e.g., using an adhesive or the like). The elastomeric layer 98 includes a thickened section 100 that is sized and shaped to be fully received by the cross tube 68, providing a tight fit between the outer surface of the sleeve 96 and the inner surface of the cross tube 68, as best shown in FIG. 8. As also shown in FIG. 8, the sleeve 96 may have a relatively small thickness, as its primary purpose is to provide support for the elastomeric layer 98 and adjustably associate the elastomeric layer 98 to the bar pin 64. Additionally, if the elastomeric layer 98 is molded onto the sleeve 96, a thin-walled sleeve 96 may allow for decreased cycle time, due to less material needing to be heated to the molding temperature.

The thickened section 100 of the elastomeric layer 98 has a greater maximum diameter than the inner diameter of the cross tube 68, such that the thickened section 100 will be compressed when it is positioned within the cross tube 68. For example, FIGS. 11 and 12 show the thickened section 100 when positioned outside of the cross tube 68 (i.e., before installation of the bushing assembly 62 into the linkage 44), while FIG. 13 shows the thickened section 100 in a compressed condition when positioned within the cross tube 68.

In the illustrated embodiment, each thickened section 100 is comprised of a pair of rings 102, with an annular groove 104 defined between the two rings 102. The annular groove 104 has a smaller diameter than the rings 102, giving the thickened section 100 (in its pre-installed condition of FIGS. 11 and 12) a generally barbell or hourglass shape. As shown in FIG. 13, in the installed or compressed condition, the rings 102 will be compressed or deformed to have a diameter that is more comparable to the diameter of the groove 104, thereby providing the thickened section 100 with a more uniform outer diameter in the compressed condition. Such a configuration may be advantageous for increasing the amount of contact between the elastomeric layer 98 and the cross tube 68, which improves the transfer of forces from the cross tube 68 to the bushing assembly 62.

Figure 14:
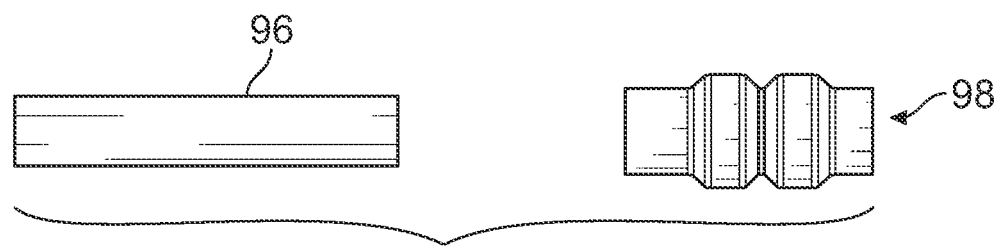
FIGS. 14-16 illustrate an exemplary method for assembling the bushing assembly of FIG. 9.
Figure 15:
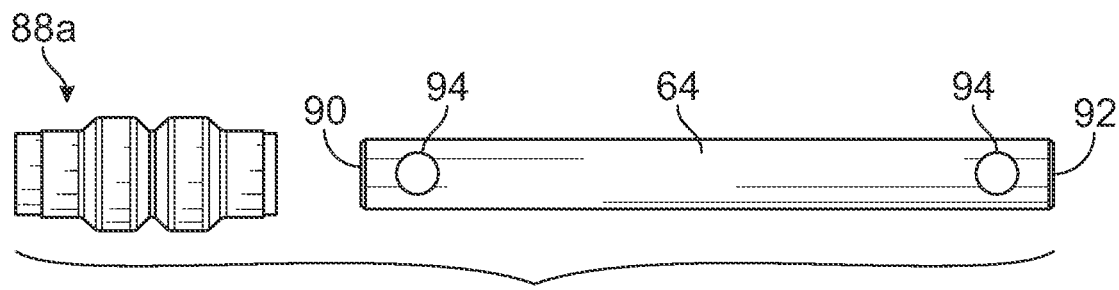

FIGS. 14 and 15 illustrate one exemplary approach to assembling a bushing assembly 62 according to the present disclosure. First, the elastomeric layer 98 is secured to the sleeve 96 (FIG. 14) to define a first bushing lobe 88*a* (FIG. 15). As described above, one possible approach is to mold the elastomeric layer 98 onto the sleeve 96, but other approaches to securing the elastomeric layer 98 to the sleeve 96 may also be employed without departing from the scope of the present disclosure. A second bushing lobe 88*b* is also formed, either using the same approach used to form the first bushing lobe 88*a* or a different approach. Additionally, the second bushing lobe 88*b* may be differently configured from the first bushing lobe 88*a* (e.g., with a wider or narrower thickened section 100 and/or a thickened section 100 that is secured to a different portion of the associated sleeve 96), though it may be preferable for identical bushing lobes to be employed for more uniform performance of the resulting bushing assembly.

Figure 16:
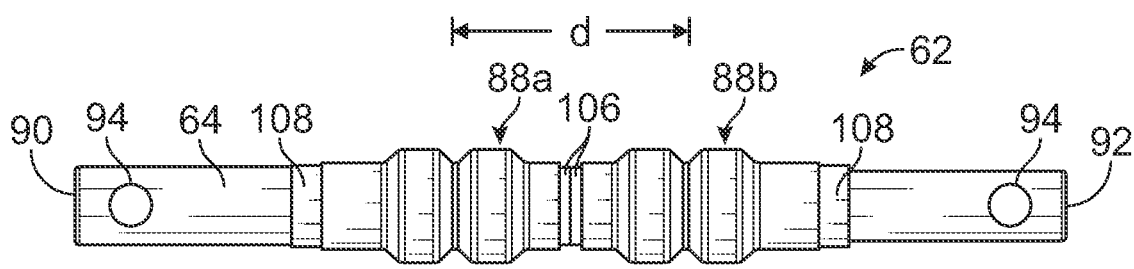

Once the two bushing lobes 88*a* and 88*b* have been formed, they are pressed onto the bar pin 64 (as in FIG. 15) to form the bushing assembly 62 (FIG. 16). It will be seen that, due to the bushing lobes 88*a* and 88*b* being configured to be pressed onto the bar pin 64, rather than an elastomeric layer being directly molded onto the bar pin 64, the positions of the bushing lobes 88*a* and 88*b* on the bar pin 64 may be readily adjusted prior to installation. Depending on the degree to which the bushing lobes 88*a* and 88*b* are pressed onto the bar pin 64 (i.e., the position of each bushing lobe 88*a*, 88*b* on the bar pin 64), the distance between the thickened sections 100 of the bushing lobes 88*a* and 88*b* will vary. For example, if the bushing lobes 88*a* and 88*b* are advanced along the bar pin 64 until they are directly adjacent to each other, with their sleeves 96 in contact with each other (as in FIG. 16), there will be a relatively small distance between the thickened sections 100. On the other hand, if the bushing lobes 88a and 88b are positioned onto the bar pin 64 with space between the sleeves 96, there will be a greater distance between the thickened sections 100. Regardless of the particular position of the bushing lobes 88a and 88b on the bar pin 64, it may be preferable for the thickened sections 100 to be centered on the bar pin 64 (i.e., with each thickened section 100 being the same distance from the midpoint of the bar pin 64, with one bushing lobe on each side of the midpoint) and positioned such that the thickened sections 100 will be completely received within the cross tube 68.

Figure 17:
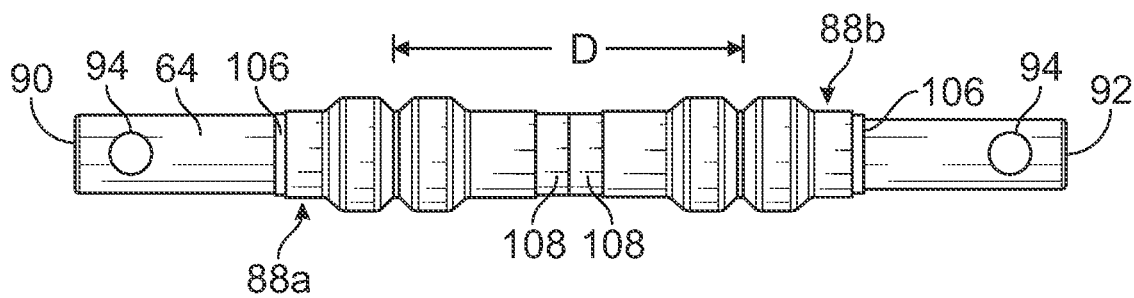
FIG. 17 is a front elevational view of an alternative configuration of a bushing assembly according to the present disclosure.

According to one embodiment, the thickened section 100 of a bushing lobe 88a, 88b may be off-centered on the associated sleeve 96 (i.e., closer to one end of the bushing lobe than to the other end of the bushing lobe), as shown in FIGS. 9-13. This allows for a single bushing lobe 88a, 88b to position its thickened section 100 at two different locations of the bar pin 64 when the sleeve 96 of the bushing lobe 88a, 88b is positioned at a particular location of the bar pin 64. This can be understood with reference to FIGS. 16 and 17. In FIGS. 16 and 17, the two bushing lobes 88a and 88b are positioned in the same locations of the bar pin 64, with the sleeves 96 of the two bushing lobes 88a and 88b in contact with each other. In FIG. 16, the bushing lobes 88a and 88b are oriented to place first ends 106 of the sleeves 96 into contact, whereas second ends 108 of the sleeves 96 are in contact in the orientation of FIG. 17. The thickened section 100 of each bushing lobe 88a, 88b is closer to the first end 106 of the associated sleeve 96 than to the second end 108, such that the thickened sections 100 are positioned a smaller distance "d" apart when the bushing lobes 88a and 88b are oriented as in FIG. 16, while being positioned a greater distance "0" apart when the bushing lobes 88a and 88b are oriented as in FIG. 17.

Figure 18:
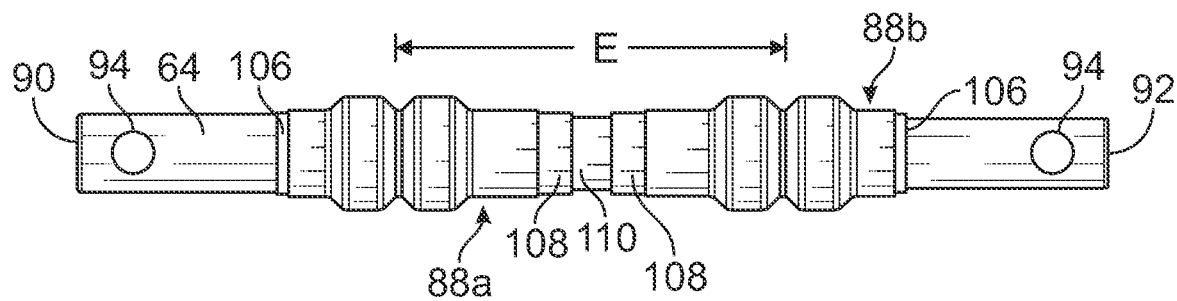
FIG. 18 is a front elevational view of another alternative configuration of a bushing assembly according to the present disclosure.

While the separation "0" of FIG. 17 may be achieved with the bushing lobes 88a and 88b oriented as in FIG. 16 (i.e., with the first ends 106 of the sleeves 96 facing each other) by providing a gap between the two bushing lobes 88a and 88b, it may be preferred for the bushing lobes 88a and 88b to be mounted onto the bar pin 64 in contact with each other, rather than with a space therebetween. However, the distance between the thickened sections 100 determines the conical rate, with a greater separation resulting in a higher conical rate, such that it may be desired for the thickened sections 100 to be spaced a relatively large distance apart. In such a scenario, in which it would be advantageous for the bushing lobes 88a and 88b to be spaced farther apart from each other, a spacer 110 (FIG. 18) may be mounted onto the bar pin 64, with the bushing lobes 88a and 88b being pressed onto the bar pin 64 and into contact with opposite ends of the spacer 110, resulting in a relatively large distance "E" between the thickened sections 100 and a greater conical rate than in FIGS. 16 and 17. In one embodiment, at least a portion of the outer surface of the spacer 110 may be provided with an elastomeric layer (e.g., a rubber layer molded onto the spacer 110), which allows the spacer 110 to effectively serve as an additional bushing lobe that contributes to the conical rate.

Figure 19:
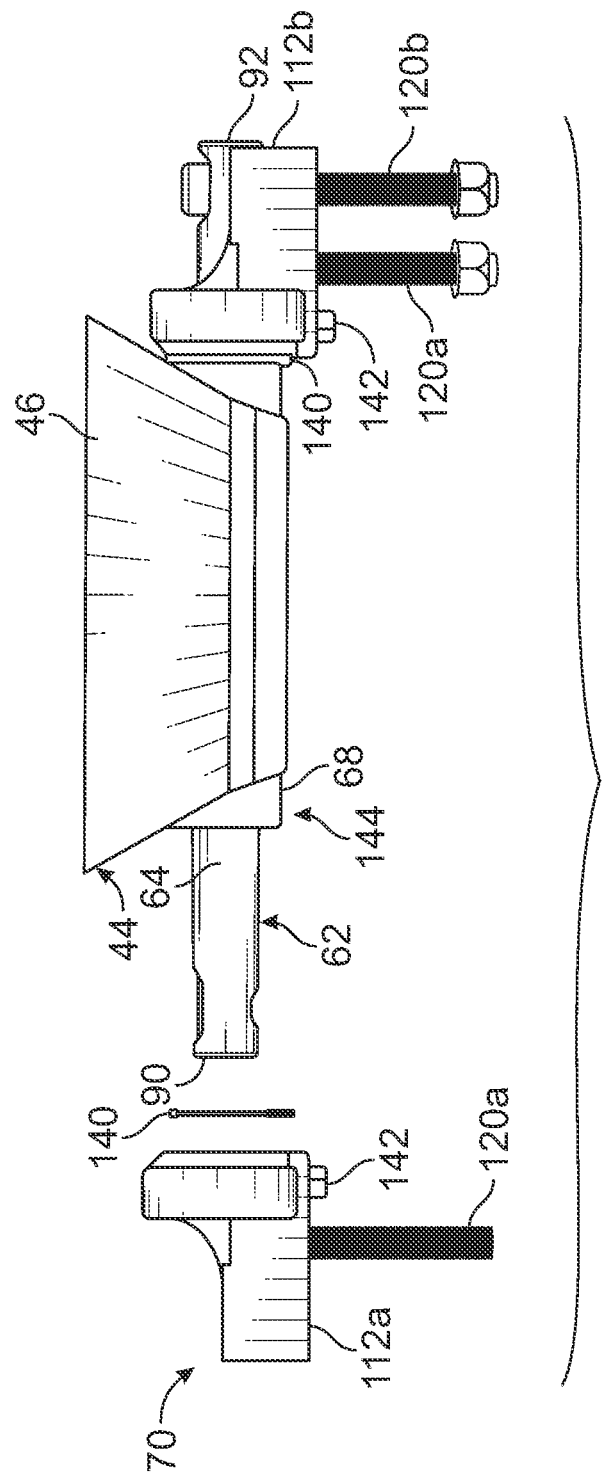
FIG. 19 is an exploded view of a mounting assembly for incorporating the wishbone-shaped linkage component of FIG. 4 into a suspension system.
Figure 20:
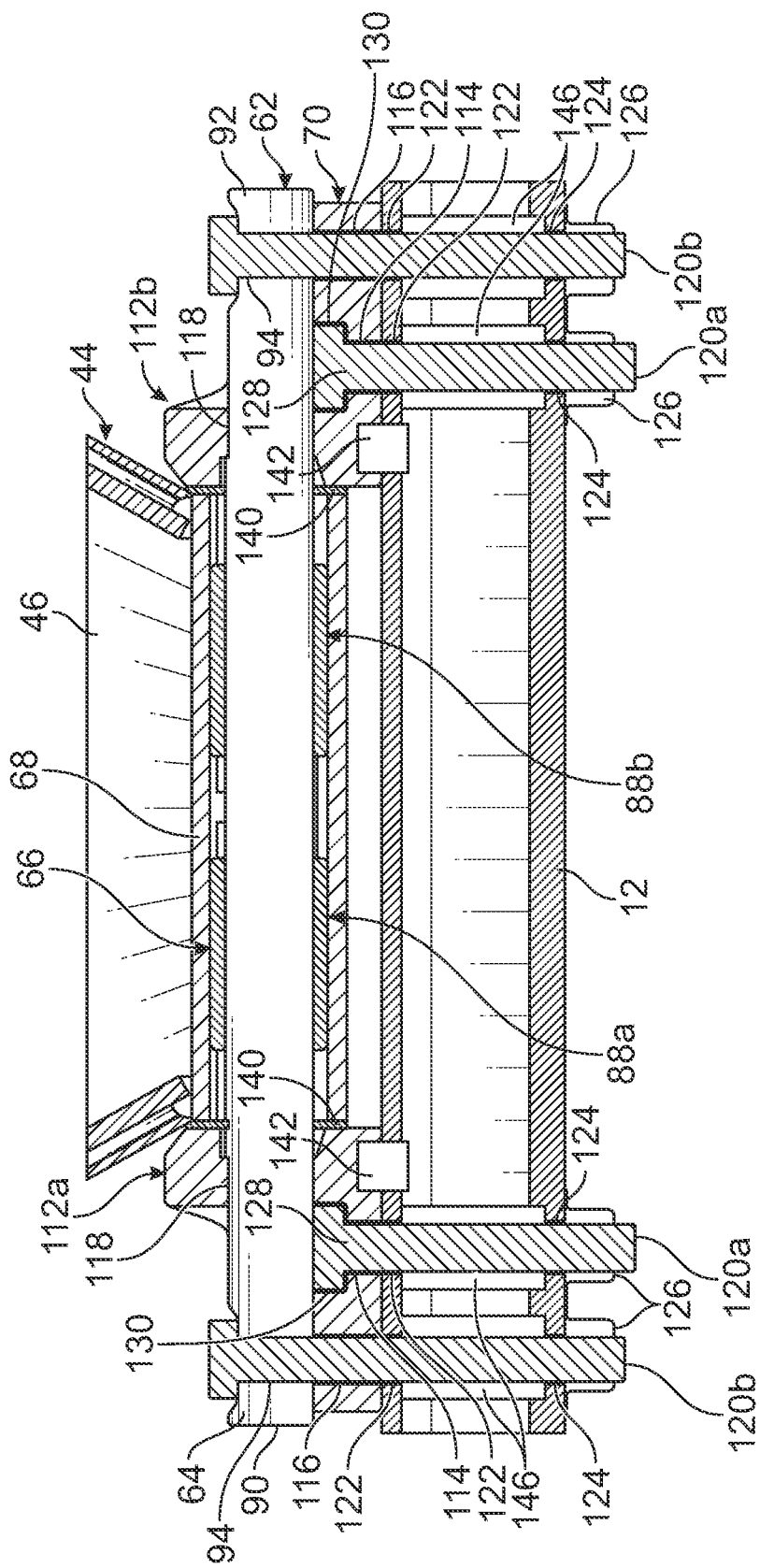
FIG. 20 is a cross-sectional view of the mounting assembly of FIG. 19, in assembled condition.

Turning now to yet another aspect of the present disclosure, FIGS. 19 and 20 show an exemplary mounting assembly 70 that may be employed to associate the linkage 44 of FIGS. 4-8 to another component of a suspension system. While the mounting assembly 70 of FIGS. 19 and 20 will be described in the context of its use in mounting the linkage 44 of FIGS. 4-8 to an axle 12, it should be understood that the mounting assembly 70 of FIGS. 19 and 20 and the features it exemplifies are not limited to use with any particular linkage and/or bushing assembly, but that mounting assemblies of this type may be used in various settings without departing from the scope of the present disclosure. It should also be understood that linkages according to the present disclosure need not be secured to another component of a suspension system using the illustrated mounting assembly 70, but that differently configured mounting assemblies may be employed without departing from the scope of the present disclosure.

The mounting assembly 70 of FIGS. 19 and 20 includes a pair of mount blocks 112a and 112b, which may be substantially identical mirror images of each other and may be formed of a metallic material (for example). Each illustrated mount block 112a, 112b includes a pair of laterally spaced, longitudinally extending bores 114 and 116 and a laterally extending bore 118 (FIG. 20). The laterally extending bore 118 of each mount block 112a, 112b is configured to accommodate one of the ends 90, 92 of the bar pin 64 of a laterally oriented bushing assembly 62 associated with the base 46 of a linkage 44, with the first mount block 112a being associated with the first end 90 of the bar pin 64 and the second mount block 112b being associated with the second end 92 of the bar pin 64, as shown in FIG. 20. By supporting the entire diameter of the bar pin 64 at the laterally extending bores 118, the stress in the bar pin 64 is reduced compared to the stress arising in a bar pin that is mounted according to a conventional approach.

The portion of each mount block 112a, 112b defining the laterally extending bore 118 (which is configured as an annular collar in the illustrated embodiment) is spaced laterally of the longitudinally extending bores 114 and 116 to allow better access to the longitudinally extending bores 114 and 116. Each longitudinally extending bore 114, 116 receives a different mechanical fastener 120a, 120b, which mechanical fasteners are configured as bolts in the illustrated embodiment, but may be differently configured without departing from the scope of the present disclosure. Each mechanical fastener 120a, 120b is received by a different hole or opening 122, 124 defined in the axle 12, as shown in FIG. 20. In the illustrated embodiment, the axle 12 includes four pairs of aligned openings 122 and 124, with one opening 122 of each pair defined in the first surface of the axle and the other opening 124 of each pair defined in an opposing second surface of the axle 12. A different one of the mechanical fasteners 120a, 120b is received by both openings 122 and 124 of each pair, with a nut 126 being applied to the end of each mechanical fastener 120a, 120b on the side of the axle 12 opposite the mount blocks 112a and 112b to secure the mount blocks 112a and 112b to the axle 12.

As shown in FIG. 20, when the bushing assembly 62 is associated to the mount blocks 112a and 112b, the bar pin 64 will overlay one of the longitudinally extending bores 114 and an enlarged head 128 of the associated mechanical fastener 120a, such that those mechanical fasteners 120a must be installed prior to mounting the mount blocks 112a and 112b to the bar pin 64. In the illustrated embodiment, each of the longitudinally extending bores 114 receiving these mechanical fasteners 120a is provided with a counterbore 130 configured to receive the enlarged head 128 of the associated mechanical fastener 120a, such that the enlarged head 128 will not interfere with the associated end 90, 92 of the bar pin 64. The counterbore 130 may provide an anti-rotation feature to prevent rotation of the mechanical fastener 120a when the enlarged head 128 is received by the counterbore 130. This feature may be achieved by configuring the counterbore 130 with a profile that matches at least a portion of the perimeter of the enlarged head 128 of the mechanical fastener 120a, such that rotation of the mechanical fastener 120a will be prevented by contact between the perimeter of the enlarged head 128 and an adjacent surface of the counterbore 130.

As for the other longitudinally extending bore 116 of each mount block 112a, 112b, it is aligned with a longitudinally extending bore 94 of the associated end 90, 92 of the bar pin 64. Portions of the mechanical fasteners 120b received by these longitudinally extending bores 116 of the mount blocks 112a and 112b are also received by the longitudinally extending bores 94 of the associated ends 90 and 92 of the bar pin 64, such that it may be advantageous for the mechanical fasteners 120b received by these longitudinally extending bores 116 of the mount blocks 112a and 112b to be longer than the mechanical fasteners 120a received by the other longitudinally extending bores 114 of the mount blocks 112a and 112b, as shown in FIG. 20. By such a configuration, the longer mechanical fasteners 120b will secure the bar pin 64 (and, hence, the bushing assembly 62) to the mount blocks 112a and 112b and the axle 12. While these mechanical fasteners 120b secure the bar pin 64 with respect to the axle 12, the elastomeric layers 98 of the bushing lobes 88a and 88b allow the linkage 44 to be pivoted with respect to the axle 12.

Figure 21:
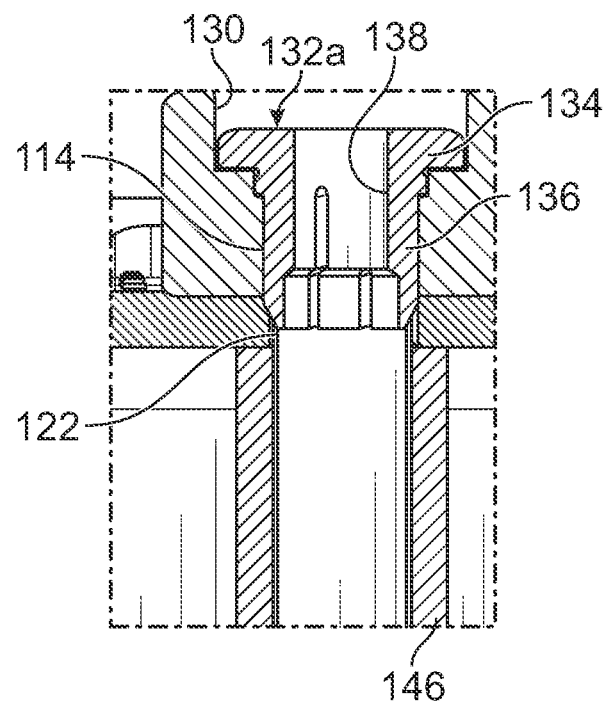
FIG. 21 is a detail view of the mounting assembly of FIG. 20, showing an exemplary embodiment of a slotted insert that may be incorporated into the mounting assembly.
Figure 22:
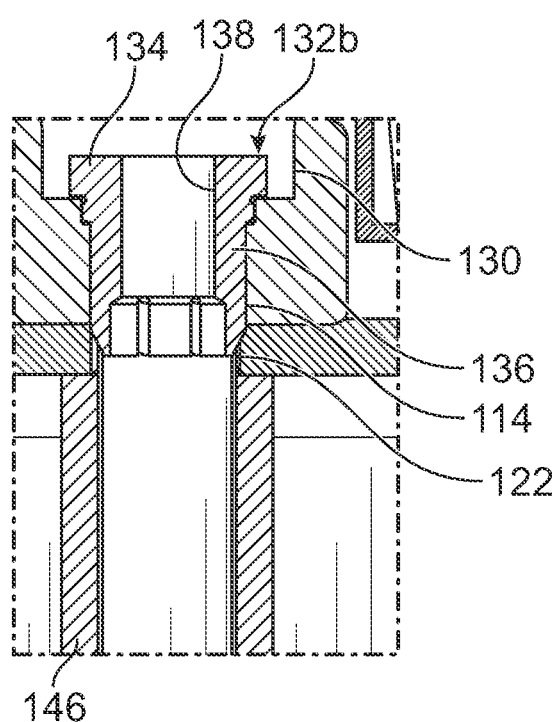
FIG. 22 is a detail view of the mounting assembly of FIG. 20, showing another exemplary embodiment of a slotted insert that may be incorporated into the mounting assembly.

In one embodiment, a body binding collar or insert of the type described in U.S. Patent Application Publication No. 2014/0271032 (which is hereby incorporated herein by reference) may be used in combination with one or more of the mechanical fasteners 120a and 120b. FIG. 21 shows one exemplary embodiment of a body-binding collar 132a, while FIG. 22 shows another exemplary embodiment of a body-binding collar 132b. While FIGS. 21 and 22 show body-binding collars 132a and 132b having an enlarged head portion 134 positioned outside of an aligned bore 114 and opening 122, it should be understood that a body-binding collar may instead omit an enlarged head, being configured to be entirely received within the aligned bore 114 and opening 122.

If a body-binding collar 132a, 132b is employed, the aligned bore 114 and opening 122 receiving the associated mechanical fastener will have a larger diameter than the diameter of the portion of the mechanical fastener received therein. A body portion 136 of the body-binding collar 132a, 132b is loosely inserted into the aligned bore 114 and opening 122, while the enlarged head portion 134 of the body-binding collar 132a, 132b remains within a counterbore 130 of the bore 114. A shaft of the mechanical fastener 120a is then advanced into the bore 114 and opening 122, with a portion of the shaft positioned within a bore 138 of the body-binding collar 132a, 132b. As the shaft is further advanced through the bore 138 of the body-binding collar 132a, 132b, an enlarged head 128 of the mechanical fastener 120a will come into contact with the enlarged head portion 134 of the body-binding collar 132a, 132b, pressing the enlarged head portion 134 of the body-binding collar 132a, 132b toward the aligned bore 114 and opening 122. The body portion 136 of the body-binding collar 132a, 132b includes a longitudinal slot and is tapered from a maximum diameter directly adjacent to the enlarged head portion 134 to a minimum diameter at the opposite end of the body portion 136, such that pressing the body-binding collar 132a, 132b into the aligned bore 114 and opening 122 will cause the slot to at least partially close and wedge the body portion 136 between the outer surface of the shaft of the mechanical fastener 120a and the aligned bore 114 and opening 122. This arrangement takes up any clearance between the shaft of the mechanical fastener 120a and the aligned bore 114 and opening 122, thereby creating a joint that is mechanically bound and more secure than what is possible using only the mechanical fastener 120a.

As only the longer mechanical fasteners 120b secure the bushing assembly 62 to the axle 12, the shorter mechanical fasteners 120a (and associated bores 114 of the mount blocks 112a and 112b and openings 122 and 124 of the axle 12) may be omitted. However, it may be advantageous to include the shorter mechanical fasteners 120a (and associated bores 114 of the mount blocks 112a and 112b and openings 122 and 124 of the axle 12) to better secure the mount blocks 112a and 112b to the axle 12.

The mounting assembly 70 may also include a pair of axial retention washers 140. If provided, the axial retention washers 140 are mounted onto the bar pin 64 of the bushing assembly 62, with one axial retention washer 140 positioned between the first mount block 112a and the cross tube 68 and the other axial retention washer 140 positioned between the second mount block 112b and the cross tube 68. The axial retention washers 140 serve to reduce noise, while also transmitting lateral inputs from the ends 80 and 86 of the cross tube 68 to the mount blocks 112a and 112b; which may be particularly advantageous in the case of extreme lateral inputs. In one embodiment, the axial retention washers 140 may be slightly thicker than the gap between the associated mount block 112a, 112b and the adjacent end 80, 86 of the cross tube 68, which ensures that any clearance in the joint is taken up to prevent any noise in the joint by effectively pre-loading the system. The axial retention washers 140 may be formed of any of a variety of materials, including metallic material and UHMW and rubber materials (which allow for additional compression when pre-loading the system), for example.

The mounting assembly 70 may further include at least one dowel pin 142, with FIGS. 19 and 20 showing a pair of dowel pins 142. If provided, each dowel pin 142 extends between one of the mount blocks 112a, 112b and the axle 12, with each dowel pin 142 being partially received by a cavity or opening defined in the surface of the associated mount block 112a, 112b facing the axle 12 and partially received by an aligned cavity or opening defined in the surface of the axle 12 facing the mount blocks 112a and 112b. In one embodiment, each dowel pin 142 may be pressed into a cavity or opening of one of the mount blocks 112a and 112b and then slip fit into the aligned cavity or opening of the axle 12. The dowel pins 142 help to hold orientation of the mount blocks 112a and 112b to the axle 12 in roll events.

According to an exemplary approach, the linkage 44 may be associated to the axle 12 using the mounting assembly 70 as follows. First, the bushing assembly 62 is pressed into the cross tube 68 of the linkage 44 to define a linkage assembly 144 (FIGS. 6 and 7). The axial retention washers 140 are slid onto the ends 90 and 92 of the bar pin 64 of the bushing assembly 62 and then the mount blocks 112a and 112b are slid onto the ends 90 and 92 of the bar pin 64. If mechanical fasteners 120a that are entrapped between the bar pin 64 and one of the mount blocks 112a, 112b are employed, the mechanical fasteners 120a are inserted into the appropriate bores 114 of the mount blocks 112a and 112b before sliding the mount blocks 112a and 112b onto the ends 90 and 92 of the bar pin 64.

The longitudinally oriented bores 94 of the ends 90 and 92 of the bar pin 64 are aligned with the corresponding bores 116 of the mount blocks 112a and 112b and mechanical fasteners 120b are inserted into the aligned bores 94 and 116. The combined linkage assembly 144 and mounting assembly 70 are then advanced toward the axle 12, with the mechanical fasteners 120a and 120b being received by respective openings 122 and 124 defined in the axle 12. If dowel pins 142 are provided, they are first pressed into the mount blocks 112a and 112b before being slip fit into corresponding receptacles defined in the axle 12 at the same time that the mechanical fasteners 120a and 120b are advanced into the openings 122 and 124 of the axle 12. Finally, the mechanical fasteners 120a and 120b are secured with respect to the axle 12 (e.g., using nuts 126) to affix the mount blocks 112a and 112b to the axle 12. As shown in FIG. 20, one or more tubular support members 146 may be positioned within the axle 12, with each tubular support member 146 extending between two aligned openings 122 and 124 and receiving a portion of the mechanical fastener 120a, 120b received by the pair of openings 122 and 124. If provided, the tubular support member 146 will strengthen the axle 12, allowing the mechanical fasteners 120a and 120b to be tightly secured to the axle 12 using nuts 126 without risk of deforming the axle 12 by overtightening the nuts 126.

As described above, the bar pin 64 of the bushing assembly 62 will be secured with respect to the axle 12, but the bushing 66 allows for the linkage 44 to pivot with respect to the axle 12. It should be understood that the foregoing approach is merely exemplary and that other approaches to associating the linkage 44 to the axle 12 (e.g., securing the mount blocks 112a and 112b to the axle 12 before associating the bushing assembly 62 to the mount blocks 112a and 112b) may be employed without departing from the scope of the present disclosure.

Aspects

Aspect 1. A linkage for use in a vehicle suspension system, the linkage comprising: a base configured to receive a laterally oriented bushing assembly; and first and second limbs each extending from the base to a free end configured to receive a laterally and longitudinally oriented bushing assembly.

Aspect 2. The linkage of Aspect 1, wherein each of the limbs extends laterally and longitudinally from the base.

Aspect 3. The linkage of any one of the preceding Aspects, wherein the free end of each of limbs includes a laterally and longitudinally oriented mounting tube configured to receive a bushing assembly.

Aspect 4. The linkage of any one of the preceding Aspects, further comprising a laterally extending cross tube, wherein the base includes upper and lower plates only partially wrapping around the cross tube, without fully encircling any portion of the cross tube.

Aspect 5. The linkage of Aspect 4, further comprising a laterally extending first weld securing the upper plate to the cross tube and a laterally extending second weld securing the lower plate to the cross tube.

Aspect 6. The linkage of any one of Aspects 4-5, further comprising a first side weld positioned adjacent to a first end of the cross tube and extending along a portion of the cross tube from the first weld to the second weld, and a second side weld positioned adjacent to a second end of the cross tube and extending along a portion of the cross tube from the first weld to the second weld.

Aspect 7. The linkage of any one of Aspects 4-6, further comprising a plurality of side plates extending from the upper plate to the lower plate, wherein the upper plate defines a perimeter, and each of the side plates extends along a different portion of the perimeter and is inset with respect to the associated portion of the perimeter.

Aspect 8. A linkage for use in a vehicle suspension system, the linkage comprising: a laterally extending cross tube configured to receive a bushing assembly; and a body including upper and lower plates only partially wrapping around the cross tube, without fully encircling any portion of the cross tube.

Aspect 9. The linkage of Aspect 8, wherein the body includes a base, and first and second limbs each extending from the base.

Aspect 10. The linkage of any one of Aspects 8-9, further comprising a laterally extending first weld securing the upper plate to the cross tube and a laterally extending second weld securing the lower plate to the cross tube.

Aspect 11. The linkage of Aspect 10, further comprising a first side weld positioned adjacent to a first end of the cross tube and extending along a portion of the cross tube from the first weld to the second weld, and a second side weld positioned adjacent to a second end of the cross tube and extending along a portion of the cross tube from the first weld to the second weld.

Aspect 12. The linkage of any one of Aspects 8-11, further comprising a plurality of side plates extending from the upper plate to the lower plate, wherein the upper plate defines a perimeter, and each of the side plates extends along a different portion of the perimeter and is inset with respect to the associated portion of the perimeter.

Aspect 13. A vehicle suspension system comprising: a laterally extending axle; a linkage; a laterally extending bushing assembly including a bushing at least partially received by the linkage, and a bar pin received by the bushing and Including first and second ends positioned on opposite lateral sides of the bushing; and a mounting assembly associating the linkage to the axle and including a first mount block associated with the first end of the bar pin, a second mount block associated with the second end of the bar pin, and first and second mechanical fasteners, wherein each end of the bar pin defines a longitudinally extending bore, with the longitudinally extending bore of the first end of the bar pin receiving a first portion of the first mechanical fastener, and with the longitudinally extending bore of the second end of the bar pin receiving a first portion of the second mechanical fastener, each mount block defines a longitudinally extending bore, with the longitudinally extending bore of the first mount block aligned with the longitudinally extending bore of the first end of the bar pin and receiving a second portion of the first mechanical fastener, and with the longitudinally extending bore of the second mount block aligned with the longitudinally extending bore of the second end of the bar pin and receiving a second portion of the second mechanical fastener, and the axle defines first and second openings, with the first opening being aligned with the longitudinally extending bores of the first end of the bar pin and the first mount block and receiving a third portion of the first mechanical fastener, and with the second opening being aligned with the longitudinally extending bores of the second end of the bar pin and the second mount block and receiving a third portion of the second mechanical fastener.

Aspect 14. The vehicle suspension system of Aspect 13, wherein the linkage includes a base and first and second limbs each extending from the base, and the bushing is at least partially received by the base.

Aspect 15. The vehicle suspension system of Aspect 14, wherein each of the limbs includes a free end receiving a laterally and longitudinally oriented bushing assembly.

Aspect 16. The vehicle suspension system of Aspect 15, wherein the free end of each of the limbs includes a laterally and longitudinally oriented mounting tube receiving a different one of the laterally and longitudinally oriented bushing assemblies.

Aspect 17. The vehicle suspension system of any one of Aspects 14-16, wherein each of the limbs extends laterally and longitudinally from the base.

Aspect 18. The vehicle suspension system of any one of Aspects 13-17, wherein the linkage includes a laterally extending cross tube receiving a portion of the laterally extending bushing assembly, and upper and lower plates only partially wrapping around the cross tube, without fully encircling any portion of the cross tube.

Aspect 19. The vehicle suspension system of Aspect 18, further comprising first and second axial retention washers, wherein the first axial retention washer is positioned between the first mount block and a first end of the cross tube and the second axial retention washer is positioned between the second mount block and a second end of the cross tube.

Aspect 20. The vehicle suspension system of any one of Aspects 13-19, wherein each mount block defines a laterally extending bore, with the laterally extending bore of the first mount block receiving a portion of the first end of the bar pin, and with the laterally extending bore of the second mount block receiving a portion of the second end of the bar pin.

Aspect 21. The vehicle suspension system of any one of Aspects 13-20, wherein each mount block defines a second longitudinally extending bore, the axle defines a third opening aligned with the second longitudinally extending bore of the first mount block and a fourth opening aligned with the second longitudinally extending bore of the second mount block, a third mechanical fastener is received by the second longitudinally extending bore and the third opening to secure the first mount block to the axle, and a fourth mechanical fastener is received by the second longitudinally extending bore and the fourth opening to secure the second mount block to the axle.

Aspect 22. The vehicle suspension system of Aspect 21, wherein each of the third and fourth mechanical fasteners includes an enlarged head positioned between the bar pin and a portion of the associated mount block.

Aspect 23. The vehicle suspension system of Aspect 22, wherein each of the second longitudinally extending bores of the first and second mount blocks includes a counterbore receiving the enlarged head of the associated third or fourth mechanical fastener.

Aspect 24. The vehicle suspension system of Aspect 23, wherein each counterbore is configured to prevent rotation of the associated third or fourth mechanical fastener when the enlarged head of the associated third or fourth mechanical fastener is received by the counterbore.

Aspect 25. The vehicle suspension system of any one of Aspects 13-24, further comprising a first dowel pin partially received by the first mount block and partially received by the axle, and a second dowel pin partially received by the second mount block and partially received by the axle.

Aspect 26. The vehicle suspension system of any one of Aspects 13-25, further comprising a torque rod, wherein the linkage is positioned at a different elevation than the torque rod, and the torque rod and the linkage are oriented at angle to each other so as to provide an anti-dive percentage in a range of approximately 25-40%.

Aspect 27. A method of associating a linkage to a vehicle axle, the method comprising: providing a laterally extending vehicle axle defining first and second openings; providing first and second mount blocks each defining a first longitudinally extending bore; providing a linkage assembly including a linkage and a laterally extending bushing assembly; associating the first mount block to a first end of the bushing assembly and associating the second mount block to a second end of the bushing assembly; aligning the first longitudinally extending bore of the first mount block and a longitudinally extending bore of the first end of the bushing assembly and inserting a first mechanical fastener into the first longitudinally extending bore of the first mount block and the longitudinally extending bore of the first end of the bushing assembly; aligning the first longitudinally extending bore of the second mount block and a longitudinally extending bore of the second end of the bushing assembly and inserting a second mechanical fastener into the first longitudinally extending bore of the second mount block and the longitudinally extending bore of the second end of the bushing assembly; aligning the first opening of the vehicle axle with the first mechanical fastener and the second opening of the vehicle axle with the second mechanical fastener; advancing the mechanical fasteners into the aligned openings of the vehicle axle to associate the linkage to the vehicle axle.

Aspect 28. The method of Aspect 27, wherein the linkage includes a base and first and second limbs each extending from the base, and the bushing is at least partially received by the base.

Aspect 29. The method of Aspect 28, wherein each of the limbs includes a free end receiving a laterally and longitudinally oriented bushing assembly.

Aspect 30. The method of Aspect 29, wherein the free end of each of the limbs includes a laterally and longitudinally oriented mounting tube receiving a different one of the laterally and longitudinally oriented bushing assemblies.

Aspect 31. The method of any one of Aspects 28-30, wherein each of the limbs extends laterally and longitudinally from the base.

Aspect 32. The method of any one of Aspects 27-31, wherein the linkage includes a laterally extending cross tube receiving a portion of the laterally extending bushing assembly, and upper and lower plates only partially wrapping around the cross tube, without fully encircling any portion of the cross tube.

Aspect 33. The method of Aspect 32, further comprising positioning a first axial retention washer between the first mount block and a first end of the cross tube, and positioning a second axial retention washer between the second mount block and a second end of the cross tube.

Aspect 34. The method of any one of Aspects 27-33, wherein each mount block defines a laterally extending bore, said associating the first mount block to the first end of the bushing assembly includes sliding the first end of the bushing assembly into the laterally extending bore of the first mount block, and said associating the second mount block to the second end of the bushing assembly includes sliding the second end of the bushing assembly into the laterally extending bore of the second mount block.

Aspect 35. The method of any one of Aspects 27-34, wherein the vehicle axle defines third and fourth openings, each of the mount blocks defines a second longitudinally extending bore, a third mechanical fastener is inserted into the second longitudinally extending bore of the first mount block and a fourth mechanical fastener is inserted into the second longitudinally extending bore of the second mount block before associating the mount blocks to the bushing assembly, and the third opening of the vehicle axle is aligned with the third mechanical fastener and the fourth opening of the vehicle axle is aligned with the fourth mechanical fastener before advancing the mechanical fasteners into the aligned openings of the vehicle axle to associate the linkage to the vehicle axle.

Aspect 36. The method of Aspect 35, wherein each of the third and fourth mechanical fasteners includes an enlarged head positioned between the bar pin and a portion of the associated mount block.

Aspect 37. The method of Aspect 36, wherein each of the second longitudinally extending bores of the first and second mount blocks includes a counterbore receiving the enlarged head of the associated third or fourth mechanical fastener.

Aspect 38. The method of any one of Aspects 27-37, further comprising associating a first portion of a first dowel pin with the first mount block and a second portion of the first dowel pin with the axle, and associating a first portion of a second dowel pin with the second mount block and a second portion of the second dowel pin with the axle.

Aspect 39. The method of any one of Aspects 27-38, wherein said providing a linkage assembly includes providing first and second bushing lobes each including a sleeve extending between first and second ends and an elastomeric layer secured to the sleeve and encircling a portion of the sleeve, positioning the first and second bushing lobes onto a bar pin to define the laterally extending bushing assembly, and associating the laterally extending bushing assembly to the linkage.

Aspect 40. The method of Aspect 39, wherein the elastomeric layer of each bushing lobe includes a thickened section, the thickened section of each elastomeric layer is positioned a first distance away from the first end of the associated sleeve, the thickened section of each elastomeric layer is positioned a second distance away from the second end of the sleeve, the first distance is different from the second distance, and said positioning the first and second bushing lobes onto the bar pin includes positioning the first and second bushing lobes onto the bar pin in one of a first configuration in which the first end of the first sleeve is in contact with the first end of the second sleeve, a second configuration in which the second end of the first sleeve is in contact with the second end of the second sleeve, and a third configuration in which the first and second bushing lobes are spaced apart, with the thickened sections being separated by different distances in each configuration.

Aspect 41. A bushing assembly comprising: a bar pin; and first and second bushing lobes movably mounted onto the bar pin, with each bushing lobe including a sleeve extending between first and second ends and an elastomeric layer secured to the sleeve and encircling a portion of the sleeve, wherein the elastomeric layer of each bushing lobe includes a thickened section, the thickened section of each elastomeric layer is positioned a first distance away from the first end of the associated sleeve, the thickened section of each elastomeric layer is positioned a second distance away from the second end of the associated sleeve, the first distance is different from the second distance, and the first and second bushing lobes are mountable onto the bar pin in at least a first configuration in which the first end of the first sleeve is in contact with the first end of the second sleeve, a second configuration in which the second end of the first sleeve is in contact with the second end of the second sleeve, and a third configuration in which the first and second bushing lobes are spaced apart, with the thickened sections being separated by different distances in each configuration.

Aspect 42. The bushing assembly of Aspect 41, further comprising a spacer mounted onto the bar pin between the first and second bushing lobes when the first and second bushing lobes are mounted onto the bar pin in the third configuration, with the sleeves of the first and second bushing lobes in contact with opposite ends of the spacer.

Aspect 43. The bushing assembly of Aspect 42, further comprising an elastomeric layer secured to at least a portion of an outer surface of the spacer.

Aspect 44. The bushing assembly of any one of Aspects 41-43, wherein each thickened section comprises first and second rings, with an annular groove defined between the first and second rings.

Aspect 45. The bushing assembly of any one of Aspects 41-44, wherein each elastomeric layer is molded onto the associated sleeve.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A linkage for use in a vehicle suspension system, the linkage comprising:
   a laterally extending cross tube configured to receive a bushing assembly; and
   a body including upper and lower plates only partially wrapping around the cross tube, without fully encircling any portion of the cross tube, wherein
      an end of the upper plate wraps around an upper portion of the cross tube and extends downwardly without contacting the lower plate, and
      an end of the lower plate wraps around a lower portion of the cross tube and extends upwardly without contacting the upper plate.

2. The linkage of claim 1, wherein the body includes
   a base, and
   first and second limbs each extending from the base.

3. The linkage of claim 2, wherein each of the first and second limbs extends from the base to a free end configured to receive a laterally and longitudinally oriented bushing assembly.

4. The linkage of claim 3, wherein each of the limbs extends laterally and longitudinally from the base.

5. The linkage of claim 3, wherein the free end of each of the first and second limbs includes a laterally and longitudinally oriented mounting tube configured to receive a bushing assembly.

6. The linkage of claim 1, further comprising a laterally extending first weld securing the upper plate to the cross tube and a laterally extending second weld securing the lower plate to the cross tube.

7. The linkage of claim 6, further comprising
   a first side weld positioned adjacent to a first end of the cross tube and extending along a portion of the cross tube from the first weld to the second weld, and
   a second side weld positioned adjacent to a second end of the cross tube and extending along a portion of the cross tube from the first weld to the second weld.

8. A vehicle suspension system comprising:
   a laterally extending axle;
   a linkage comprising a laterally extending cross tube and a body including upper and lower plates only partially wrapping around the cross tube, without fully encircling any portion of the cross tube;
a laterally extending bushing assembly including
a bushing at least partially received by the cross tube of the linkage, and
a bar pin received by the bushing and including first and second ends positioned on opposite lateral sides of the bushing; and
a mounting assembly associating the linkage to the axle and including
a first mount block associated with the first end of the bar pin,
a second mount block associated with the second end of the bar pin, and
first and second mechanical fasteners, wherein
each end of the bar pin defines a longitudinally extending bore, with the longitudinally extending bore of the first end of the bar pin receiving a first portion of the first mechanical fastener, and with the longitudinally extending bore of the second end of the bar pin receiving a first portion of the second mechanical fastener,
each mount block defines a longitudinally extending bore, with the longitudinally extending bore of the first mount block aligned with the longitudinally extending bore of the first end of the bar pin and receiving a second portion of the first mechanical fastener, and with the longitudinally extending bore of the second mount block aligned with the longitudinally extending bore of the second end of the bar pin and receiving a second portion of the second mechanical fastener, and
the axle defines first and second openings, with the first opening being aligned with the longitudinally extending bores of the first end of the bar pin and the first mount block and receiving a third portion of the first mechanical fastener, and with the second opening being aligned with the longitudinally extending bores of the second end of the bar pin and the second mount block and receiving a third portion of the second mechanical fastener.

9. The vehicle suspension system of claim 8, wherein each mount block defines a laterally extending bore, with the laterally extending bore of the first mount block receiving a portion of the first end of the bar pin, and with the laterally extending bore of the second mount block receiving a portion of the second end of the bar pin.

10. The vehicle suspension system of claim 8, wherein each mount block defines a second longitudinally extending bore, the axle defines a third opening aligned with the second longitudinally extending bore of the first mount block and a fourth opening aligned with the second longitudinally extending bore of the second mount block, a third mechanical fastener is received by the second longitudinally extending bore and the third opening to secure the first mount block to the axle, and a fourth mechanical fastener is received by the second longitudinally extending bore and the fourth opening to secure the second mount block to the axle.

11. The vehicle suspension system of claim 10, wherein each of the third and fourth mechanical fasteners includes an enlarged head positioned between the bar pin and a portion of the associated mount block.

12. The vehicle suspension system of claim 11, wherein each of the second longitudinally extending bores of the first and second mount blocks includes a counterbore receiving the enlarged head of the associated third or fourth mechanical fastener.

13. The vehicle suspension system of claim 12, wherein each counterbore is configured to prevent rotation of the associated third or fourth mechanical fastener when the enlarged head of the associated third or fourth mechanical fastener is received by the counterbore.

14. The vehicle suspension system of claim 8, further comprising a first dowel pin partially received by the first mount block and partially received by the axle, and a second dowel pin partially received by the second mount block and partially received by the axle.

15. The vehicle suspension system of claim 8, further comprising a torque rod, wherein the linkage is positioned at a different elevation than the torque rod, and the torque rod and the linkage are oriented at angle to each other so as to provide an anti-dive percentage in a range of approximately 25-40%.

16. The vehicle suspension system of claim 8, wherein the laterally extending bushing assembly further includes first and second bushing lobes movably mounted onto the bar pin, with each bushing lobe including a sleeve extending between first and second ends and an elastomeric layer secured to the sleeve and encircling a portion of the sleeve, wherein
the elastomeric layer of each bushing lobe includes a thickened section,
the thickened section of each elastomeric layer is positioned a first distance away from the first end of the associated sleeve,
the thickened section of each elastomeric layer is positioned a second distance away from the second end of the associated sleeve,
the first distance is different from the second distance, and
the first and second bushing lobes are mountable onto the bar pin in at least a first configuration in which the first end of the first sleeve is in contact with the first end of the second sleeve, a second configuration in which the second end of the first sleeve is in contact with the second end of the second sleeve, and a third configuration in which the first and second bushing lobes are spaced apart, with the thickened sections being separated by different distances in each configuration.

17. The vehicle suspension system of claim 16, further comprising a spacer mounted onto the bar pin between the first and second bushing lobes when the first and second bushing lobes are mounted onto the bar pin in the third configuration, with the sleeves of the first and second bushing lobes in contact with opposite ends of the spacer.

18. The vehicle suspension system of claim 16, wherein each thickened section comprises first and second rings, with an annular groove defined between the first and second rings.

19. A linkage for use in a vehicle suspension system, the linkage comprising:
a laterally extending cross tube configured to receive a bushing assembly; and
a body including
upper and lower plates only partially wrapping around the cross tube, without fully encircling any portion of the cross tube, and
a plurality of side plates extending from the upper plate to the lower plate, wherein
the upper plate defines a perimeter, and
each of the side plates extends along a different portion of the perimeter and is inset with respect to the associated portion of the perimeter.

* * * * *